United States Patent [19]

Maeda et al.

[11] Patent Number: 5,641,175
[45] Date of Patent: *Jun. 24, 1997

[54] SUSPENSION SYSTEM FOR AUTOMOBILE

[75] Inventors: Hiroshi Maeda, Yokohama; Akihiko Sakazaki, Oota, both of Japan

[73] Assignees: Yorozu Corporation; Fuji Jukogyo Kabushiki Kaisha, both of Japan

[*] Notice: The term of this patent shall not extend beyond the expiration date of Pat. No. 5,478,103.

[21] Appl. No.: 501,376

[22] Filed: Jul. 12, 1995

Related U.S. Application Data

[63] Continuation of Ser. No. 107,193, Aug. 17, 1993, Pat. No. 5,478,103.

[30] Foreign Application Priority Data

Aug. 19, 1992 [JP] Japan ................ 4-220030
Aug. 19, 1992 [JP] Japan ................ 4-220031
Aug. 19, 1992 [JP] Japan ................ 4-220032

[51] Int. Cl.$^6$ ............ B62D 17/00; B60G 11/18
[52] U.S. Cl. ............ 280/664; 280/721; 267/273
[58] Field of Search .................... 280/664, 665, 280/688, 689, 717, 721, 700, 661, 695; 267/273

[56] References Cited

U.S. PATENT DOCUMENTS

| | | | |
|---|---|---|---|
| 2,169,335 | 8/1939 | Best ........................... | 280/664 |
| 3,198,507 | 8/1965 | Kozicki ...................... | 267/57 |
| 3,526,413 | 9/1970 | Muller ........................ | 280/96.2 |
| 4,042,258 | 8/1977 | Cislo ........................... | 280/664 |
| 4,249,753 | 2/1981 | Froumajou ................. | 280/673 |
| 4,415,178 | 11/1983 | Hatsushi et al. .......... | 280/664 |
| 4,470,616 | 9/1984 | Kaneko et al. ............ | 280/721 |
| 4,488,736 | 12/1984 | Aubry et al. ............... | 280/723 |
| 4,781,364 | 11/1988 | Finn et al. ................... | 267/260 |
| 5,478,103 | 12/1995 | Meada et al. .............. | 280/721 |

FOREIGN PATENT DOCUMENTS

| | | | |
|---|---|---|---|
| 980291 | 12/1952 | France ......................... | 280/721 |
| 2296542 | 12/1974 | France ......................... | 280/664 |
| 1232482 | 1/1967 | Germany . | |
| 1236950 | 3/1967 | Germany . | |
| 57-110514 | 7/1982 | Japan . | |
| 61-27287 | 8/1986 | Japan . | |
| 62-101507 | 5/1987 | Japan . | |
| 1003255 | 9/1965 | United Kingdom . | |
| 1010951 | 11/1965 | United Kingdom . | |
| 1344931 | 1/1974 | United Kingdom . | |

*Primary Examiner*—Paul N. Dickson
*Attorney, Agent, or Firm*—Beveridge, DeGrandi, Weilacher & Young, L.L.P.

[57] ABSTRACT

A rear end of a torsion bar is fixed to a distal portion of a spring plate so that the rear end of the torsion bar is in a position other than front to rear direction of a cross member. Thus, when a load is applied to the suspension system in the front to rear direction, the spring plate elastically deforms in this direction. Therefore, the suspension system can prevent the torsion bar from directly contacting the cross member. Also, the suspension arm has two arm portions each of which is supported by two pivot portions. The body has sufficient rigidity against a load applied in the lateral direction thereof. When a load is applied in the front to rear direction, the spring plate elastically deforms, thereby moving the suspension system in this direction. When a load is applied in the vertical direction of the body, the torsion bar twists. With this reaction force, a suspension force takes place and the spring plate bends. Thus, an excessive bending force is not applied to the torsion bar.

11 Claims, 26 Drawing Sheets

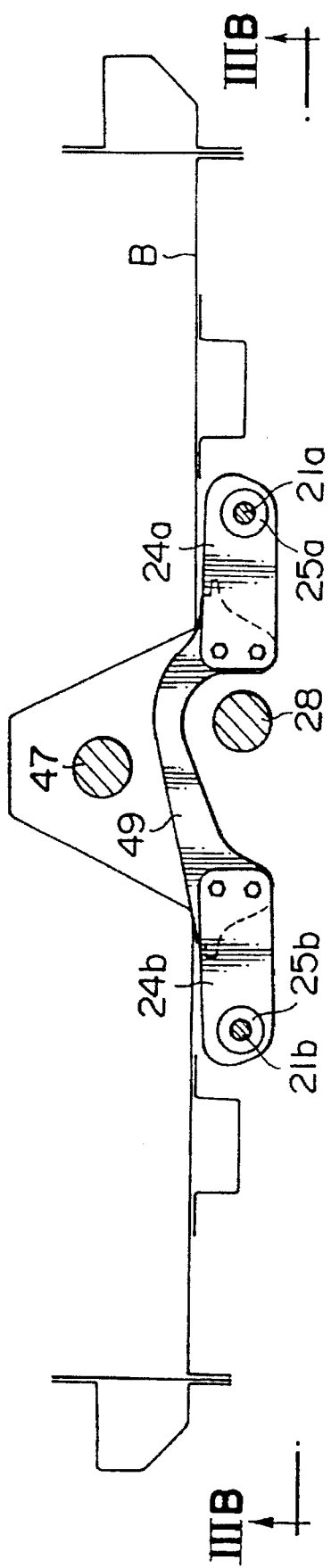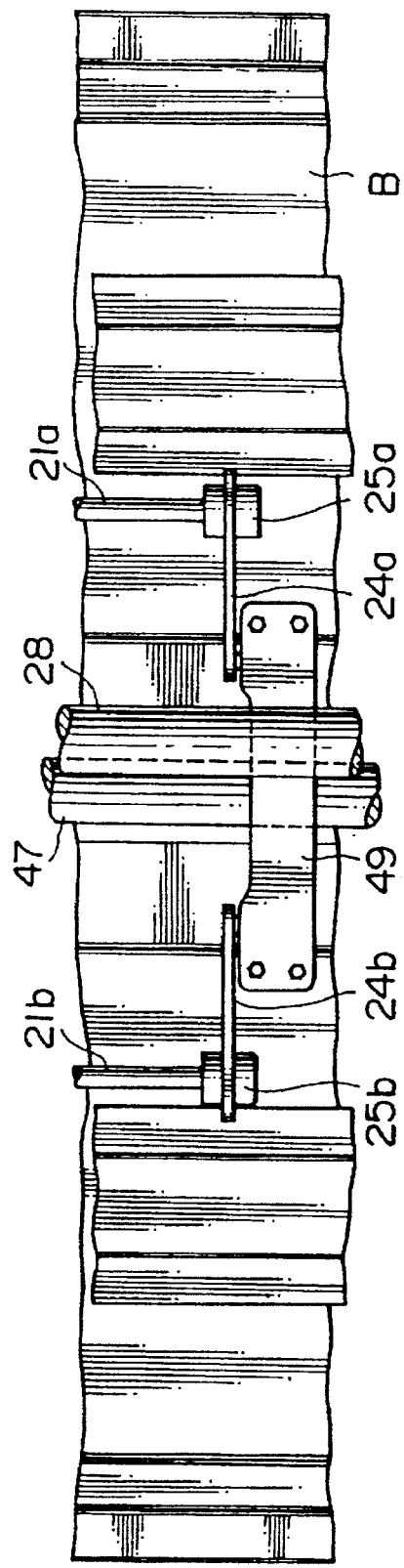
FIG. 3A
FIG. 3B

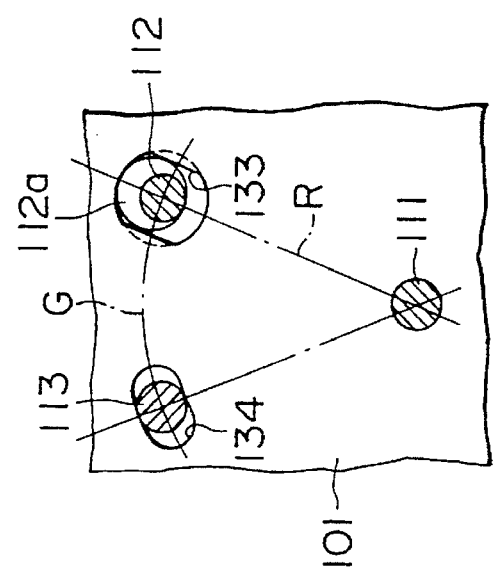
FIG. 17C
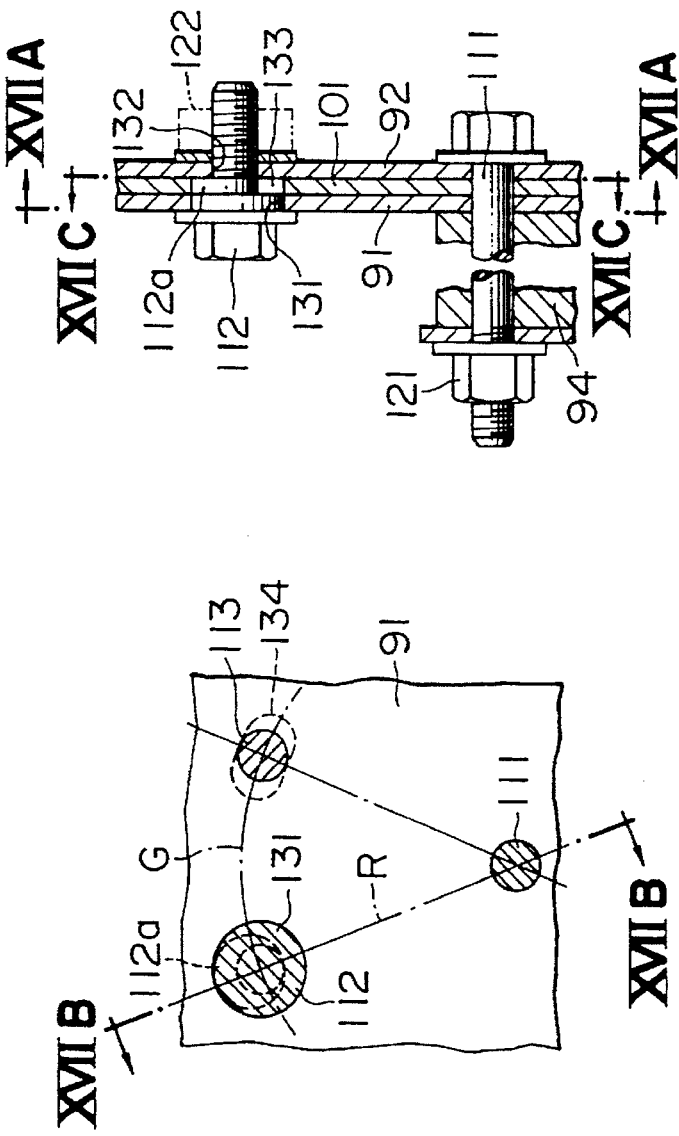
FIG. 17B
FIG. 17A

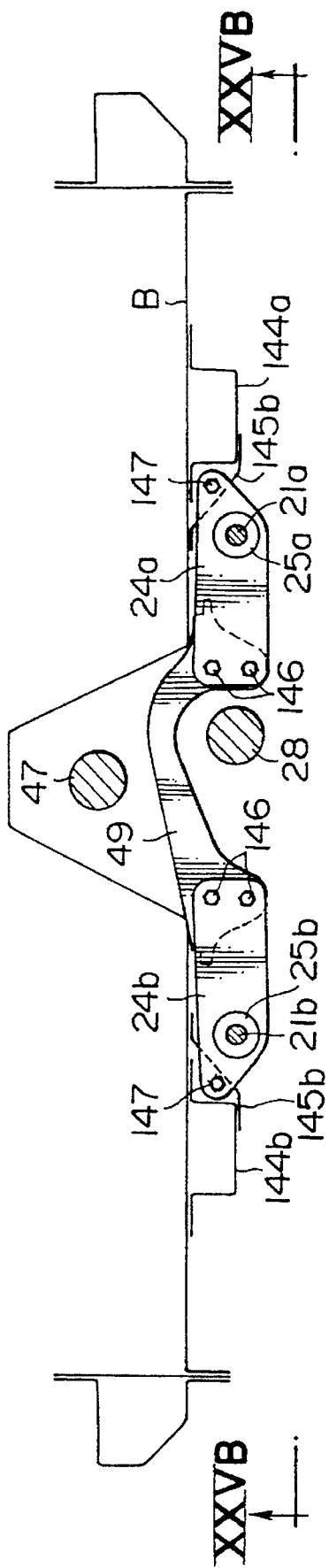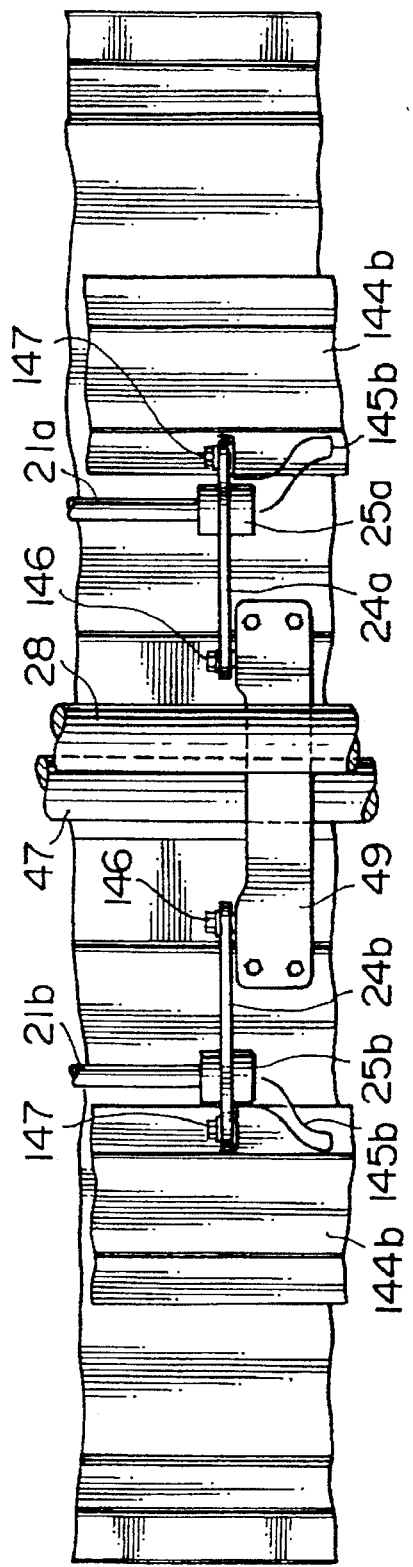

SUSPENSION SYSTEM FOR AUTOMOBILE

This application is a continuation of application Ser. No. 08/107,193, filed on Aug. 17, 1993, now U.S. Pat. No. 5,478,103, which is incorporated entirely herein by reference.

BACKGROUND OF THE INVENTION

1. Field of Invention

The present invention relates to a suspension system for an automobile, in particular, to a suspension system for an automobile having a torsion bar.

2. Description of the Related Art

Japanese Utility Model Publication No. 61-27287 discloses a suspension system having a torsion bar which is twisted to urge a suspension arm when a load is applied to the arm in a substantially vertical direction of an automobile body, and which is allowed to move in a substantially front to rear or longitudinal direction of the body. This related art reference will hereinafter be referred to as the first related art reference. In this front suspension system, a front end of the torsion bar is mounted at the center of the rotation of a lower arm. In addition, a cross member is provided with a proximal end of an anchor arm which is made of a spring plate and extends in a substantially lateral direction of the body. The rear end of the torsion bar is fixed to a distal end of the anchor arm. Thus, when a load is applied to the suspension system in the substantially front to rear direction of the body, the anchor arm made of the spring plate elastically deforms, thereby moving the torsion bar and the lower arm in the substantially longitudinal direction of the body. Therefore, the riding comfort of the automobile is improved.

When a load is applied to the suspension system of this type, it is necessary to prevent the rear end of the torsion bar from directly contacting the cross member. Otherwise, the load will be transmitted from the torsion bar to the automobile body through the cross member. Thus, the riding comfort will be degraded. Therefore, in the suspension system disclosed in the first related art reference, the rear end of the torsion bar is provided with a rubber bushing so as to prevent the torsion bar from directly contacting the cross member.

However, when a load is applied to the suspension system in the substantially longitudinal direction of the body, a large reaction force takes place on the rubber bushing and thereby the rubber bushing is excessively worn. Therefore, the rubber bushing should have high durability. Nevertheless, if the rubber bushing is made of relatively hard rubber, the durability may be satisfied. However, the load will be transmitted to the body through the rubber bushing and the cross member, thereby degrading the riding comfort.

Another suspension system which is allowed to move in the substantially longitudinal direction of the body is disclosed in Japanese Patent Application Laid-Open No. 57-110514. This related art reference will hereinafter be referred to as the second related art reference. In this front suspension system, a lower arm is rotatably supported to the body at one position thereof. One end of a spring plate is fixed to the lower arm, whereas the other end of the spring plate is fixed to a front end of a torsion bar. Thus, when a load is applied to the suspension system in the substantially front to rear direction of the body, the spring plate elastically deforms and the lower arm moves in the substantially front to rear direction of the body, thereby improving the riding comfort of the automobile.

The construction of such a suspension system does not have enough rigidity against a load which is applied in the lateral direction of the body of the automobile. Thus, a bending force may be applied to the torsion bar. In the suspension system disclosed in the second related art reference, to prevent such a bending force from being applied to the torsion bar, the vicinity of a front end of the torsion bar is supported to a front end of a support member extending from the cross member by a bushing. In addition, a portion extending from the middle to the rear end of the torsion bar is movably supported by a cylindrical member which is supported by the cross member. Thus, this suspension system prevents a bending force from being applied to the torsion bar, thereby improving the rigidity in the lateral direction of the body of the automobile.

However, although the support member and the cylindrical member may prevent a bending force from being applied to the torsion bar, they will complicate the construction of the suspension system. Thus, such a suspension system is difficult to practically use.

In Japanese Patent Application Laid-Open No. 62-101507, a further suspension system is disclosed. This related art reference will hereinafter be referred to as the third related art reference. In this suspension system, a torsion bar is supported by a lower arm at a plurality of positions thereof so as to prevent a bending force from being applied to the torsion bar. However, in the third related art reference, the mounting construction of the lower arm and the torsion bar will become complicated.

SUMMARY OF THE INVENTION

A first object of the present invention is to provide a suspension system for an automobile, which securely prevents a torsion bar from directly contacting a cross member without necessity of a rubber bushing, and which is allowed to move in a substantially front to rear direction of the body of the automobile when a load is applied, so as to securely improve the riding comfort of the automobile.

A second object of the present invention is to provide a suspension system for an automobile, which prevents a bending force from being applied to a torsion bar with a simple construction so as to improve the rigidity in a lateral direction of the body of the automobile and the riding comfort and steering stability thereof.

According to the present invention, there is provided a suspension system for an automobile having a cross member across a body thereof, comprising a suspension arm for supporting a wheel and rotatably mounted on the body; a torsion bar extending in a substantially longitudinal direction of the body and having one end connected with the suspension arm; and a spring plate extending from the body in a substantially lateral direction and having a portion for connecting with another end of said torsion bar, the connecting portion being in a position other than the front to rear direction of the cross member.

Since the connecting portion of the spring plate is in a position other than the front to rear direction of the cross member, when a load is applied to the suspension system in the substantially longitudinal direction of the body, the spring plate elastically deforms, thereby allowing the suspension system to move in the direction. In addition, the suspension system can securely prevent the torsion bar from directly contacting the cross member without necessity of a rubber bushing. Thus, when a load is applied to the suspension system in the substantially longitudinal direction and thereby the suspension system moves in this direction, the load is not applied to the body. As a result, the riding comfort of the automobile is securely improved.

According to the present invention, there is also provided a suspension system for an automobile, a body thereof having first and second pivot portions for supporting the suspension system comprising: a suspension arm for supporting a wheel and having first and second arm portions rotatably mounted on first and second pivot portions which are shifted with each other in a substantially longitudinal direction; a torsion bar having one end connected to the body; and a spring plate having a proximal portion mounted on the suspension arm, and a portion for connecting with the another end of the torsion bar.

The suspension arm has the two arm portions each of which is supported to the two pivot portions. Thus, the suspension system has enough rigidity against a load applied in the substantially longitudinal direction of the body, thereby preventing a bending force from being applied to the torsion bar with a simple construction.

When a load is applied in the substantially front to rear direction of the body, the spring plate elastically deforms and thereby the suspension arm moves in this direction. Thus, riding the automobile becomes comfortable.

When a load is applied in a substantially vertical direction of the body, the torsion bar twists and thereby a suspension force as the reaction force takes place. In addition, the spring plate bends and thereby an excessive bending moment is not applied to the torsion bar. Thus, the torsion bar may be constructed of a thin and short member. As a result, the riding comfort and steering stability is improved.

BRIEF DESCRIPTION OF THE DRAWINGS

FIG. 3A is a perspective view schematically showing the structure of a spring plate mounted on the body according to a second modification of the first embodiment;

FIG. 3B is a view taken along line IIIB—IIIB of FIG. 3A;

FIG. 17 are views showing the structure of an automobile height adjustment mechanism, where FIG. 17A is a sectional view taken along line XVIIA—XVIIA of FIG. 17B; FIG. 17B is a sectional view taken along line XVIIB—XVIIB of FIG. 17A, and FIG. 17C is a sectional view taken along line XVIIC—XVIIC of FIG. 17B;

FIG. 18 are views showing the structure of a caster angle adjustment mechanism, where

FIG. 19 are views showing the structure of a camber angle adjustment mechanism, where

FIG. 20 are views showing the structure of a caster angle and camber angle adjustment mechanism, where

FIG. 21 are views showing the structure of an automobile height and camber angle adjustment mechanism, where

FIG. 22 are views showing the structure of a modification of the automobile height adjustment mechanism of FIG. 17, where

FIG. 23 are views showing the structure of a modification of the caster angle adjustment mechanism of FIG. 18, where

FIG. 25A is a plan view schematically showing the structure of spring plates mounted on the body of an automobile according to a first modification of the fourth embodiment;

FIG. 25B is a view taken along line XXVB—XXVB of FIG. 25A;

DETAILED DESCRIPTION OF THE PREFERRED EMBODIMENTS

Preferred embodiments of the present invention will become understood from the following detailed description referring to the accompanying drawings.

Figure 1:
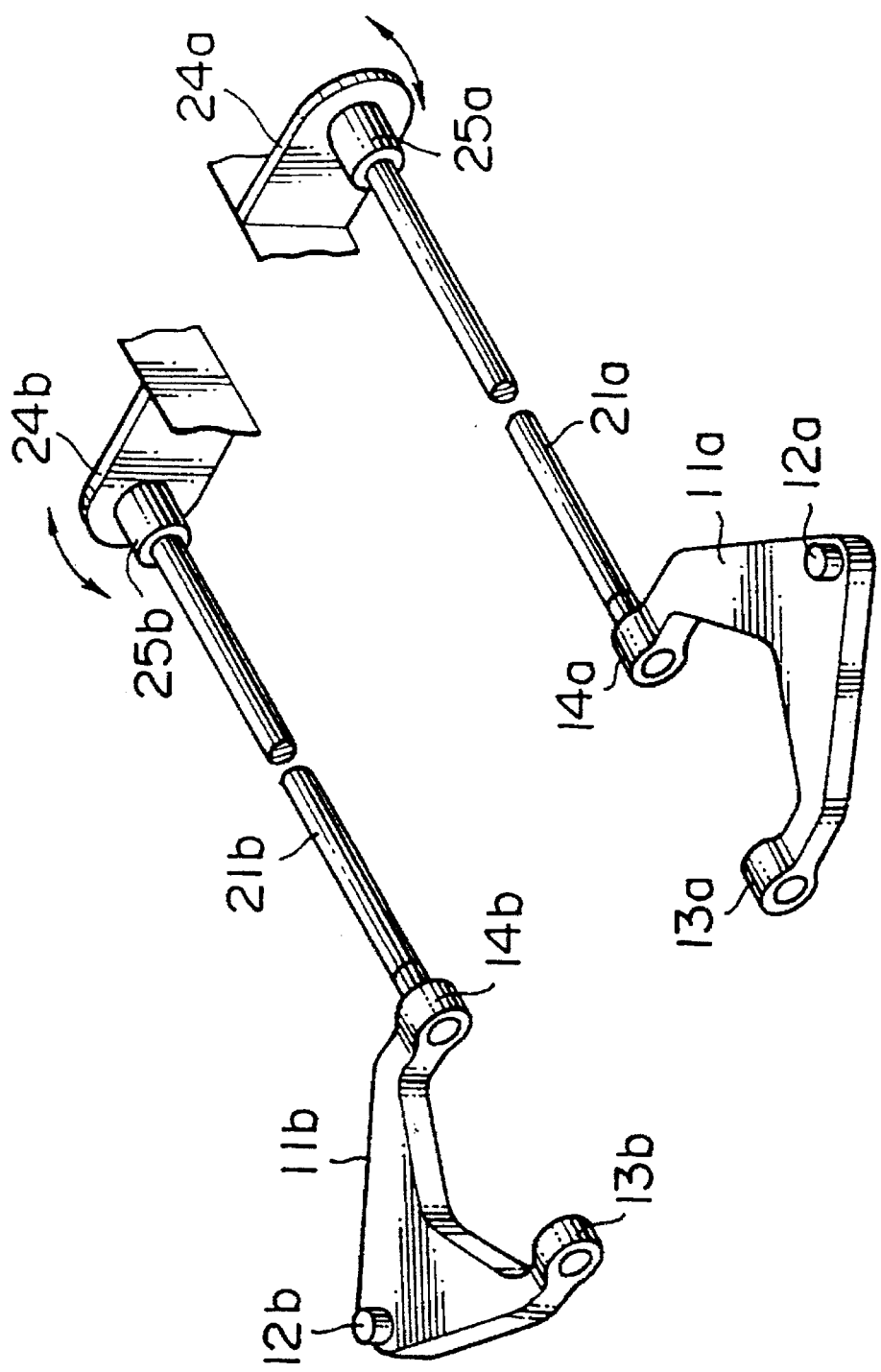
FIG. 1 is a perspective view schematically showing a structure of a suspension system for an automobile according to a first embodiment of the present invention.

FIG. 1 is a schematic diagram showing the construction of a principal portion of a suspension system for an automobile according to an embodiment of the present invention. The suspension system is used for suspending a front wheel on the left or right of the automobile.

A left-side lower arm (suspension arm) 11a of A-letter shaped type is disposed on the left side of the automobile body. The left-side lower arm 11a has a ball joint 12a disposed at a front end thereof. The ball joint 12a is connected to a knuckle (not shown) at a lower end portion thereof. The lower arm 11a has two pivot portions 13a and 14a which are disposed in front and rear positions of a distal portion thereof. The lower arm 11a is rotatable about the pivot portions 13a and 14a to the body of the automobile. The center axis of the pivot portions 13a and 14a extends nearly in a substantially longitudinal (or front to rear) direction of the body. A right-side lower arm 11b is opposed to the left-side lower arm 11a and mounted on the right side of the body. The right-side lower arm 11a is rotatable about pivot portions 13b and 14b. Likewise, the right-side lower arm 11b is provided with a ball joint 12b at a front end portion thereof.

The upper end portion of the knuckle is connected to an upper arm (not shown) so as to rotatably support the wheel. Each of the lower arms is connected to a lower end portion of a shock absorber. In addition, the left and right lower arms are connected with a stabilizer (not shown). The arms, knuckles, and so forth principally construct the suspension system which suspends the front wheels on the left and right of the body of the automobile.

To the pivot portion 14a behind the left lower arm 11a is fixed a front end portion of a left torsion bar 21a. Likewise, to the pivot portion 14b behind the right lower arm 11b is fixed a front end portion of a right torsion bar 21b. Thus, as shown in FIG. 1, each center axis of the torsion bars 21a and 21b almost accords with the center axis of the pivot portion thereof.

To a cross member of the body is fixed a rear end portion of each of spring plates 24a and 24b by appropriate fastening means such as welding. The spring plate 24a extends in a direction perpendicular to the center axis of the torsion bar 21a. Likewise, the spring plate 24b extends in a direction perpendicular to the center axis of the torsion bar 21b. A sleeve 25a is welded to a front end portion (free end portion) of the spring plate 24a. Likewise, a sleeve 25b is welded to a front end portion (free end portion) of the spring plate 24b. The sleeve 25a is fixed to a rear end portion of the left torsion bar 21a. Likewise, the sleeve 25b is fixed to a rear end portion of the right torsion bar 21b.

In this suspension system, when a load is applied to the lower arms 11a and 11b in the substantially longitudinal direction of the body, the spring plates 24a and 24b bend in the arrow direction shown in FIG. 1, thereby absorbing the load. Thus, a compression stress and a tensile stress against the torsion bars 21a and 21b are alleviated. In addition, the torsion bars 21a and 21b do not prevent the suspension system from bending and moving in the substantially longitudinal direction of the body. Moreover, an excessive bending stress is not applied to each of the torsion bars 21a and 21b.

In addition, the free end portions of the spring plates 24a and 24b fixed to the rear end portions of the torsion bars 21a and 21b are spaced apart from the cross member. Thus, without necessity of a rubber bushing, the suspension system can securely prevent the torsion bars 21a and 21b from directly contacting the cross member. Thus, when a load is applied thereto and the suspension system moves in this direction, the load is not transmitted to the body. As a result, the riding comfort is securely improved.

FIGS. 2A, 2B, 2C, and 2D show the construction of a first modification of the first embodiment. In FIG. 1, the spring plates 24a and 24b are mounted on the body by welding, whereas in FIG. 2, the spring plates 24a and 24b are mounted to the body with bolts.

Figure 2A:
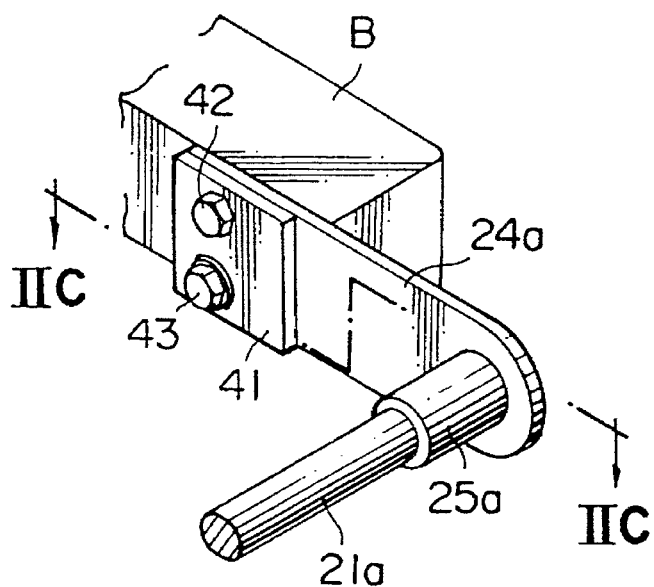
FIG. 2A is a perspective view schematically showing the structure of a spring plate mounted on the body of an automobile according to a first modification of the first embodiment.
Figure 2B:
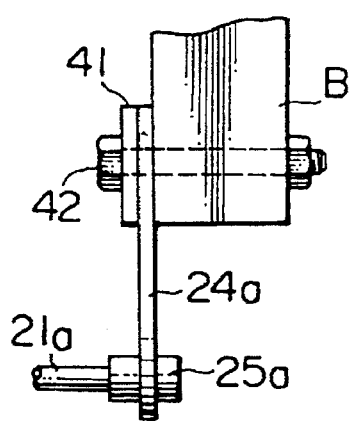
FIG. 2B is a plan view of FIG. 2A.
Figure 2C:
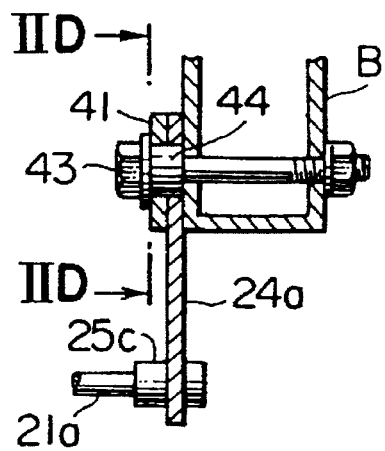
FIG. 2C is a sectional view taken along line IIC—IIC of FIG. 2A.
Figure 2D:
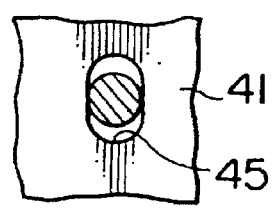
FIG. 2D is a sectional view taken along line IID—IID of FIG. 2C.

A reinforcement plate 41 is integrally connected to the front end portion of the spring plate 24a. Along with the reinforcement plate 41, the spring plate 24a is mounted on the body B with bolts 42 and 43. As shown in FIG. 2C, the bolt 43 has a cam portion 44 on the head side thereof. The cam portion 44 is eccentrically formed on the bolt 43. The cam portion 44 is fit in an oval hole 45 formed on the reinforcement plate 41, the oval hole 45 extending in the substantially vertical direction of the body. On the other hand, the bolt 42 is not eccentrically mounted. Thus, the spring plate 24a is slidable about the bolt 42 along with the reinforcement plate 41. Therefore, when both the bolts 42 and 43 are being loosened and then the bolt 43 is further rotated, the spring plate 24a is rotated about the bolt 42 and thereby the proximal portion of the spring plate 24a moves in the substantially vertical direction of the body B. Consequently, the positions of the sleeve 25a can be changed with respect to the body B in the substantially vertical direction of the body B. Thus, the height of the body B can be adjusted. For the sake of simplicity, FIG. 2 shows only the mounting structure of the spring plate 24a. Thus, the mounting structure of the other spring plate 24b is the same as that of the spring plate 24a.

FIGS. 3A and 3B show the structure of a second modification of the spring plate for use in the suspension system shown in FIGS. 1 and 2. A propeller shaft 47 and an exhaust pipe 28 are disposed at a center portion of the body B and extend in the substantially longitudinal direction thereof. A cross member 49 is disposed between the propeller shaft 47 and the exhaust pipe 28. The cross member 49 is connected to distal portions of the spring plates 24a and 24b with bolts. The torsion bars 21a and 21b are respectively fixed to the sleeves 25a and 25b which are mounted on the distal portions of the spring plates 24a and 24b.

Figure 4:
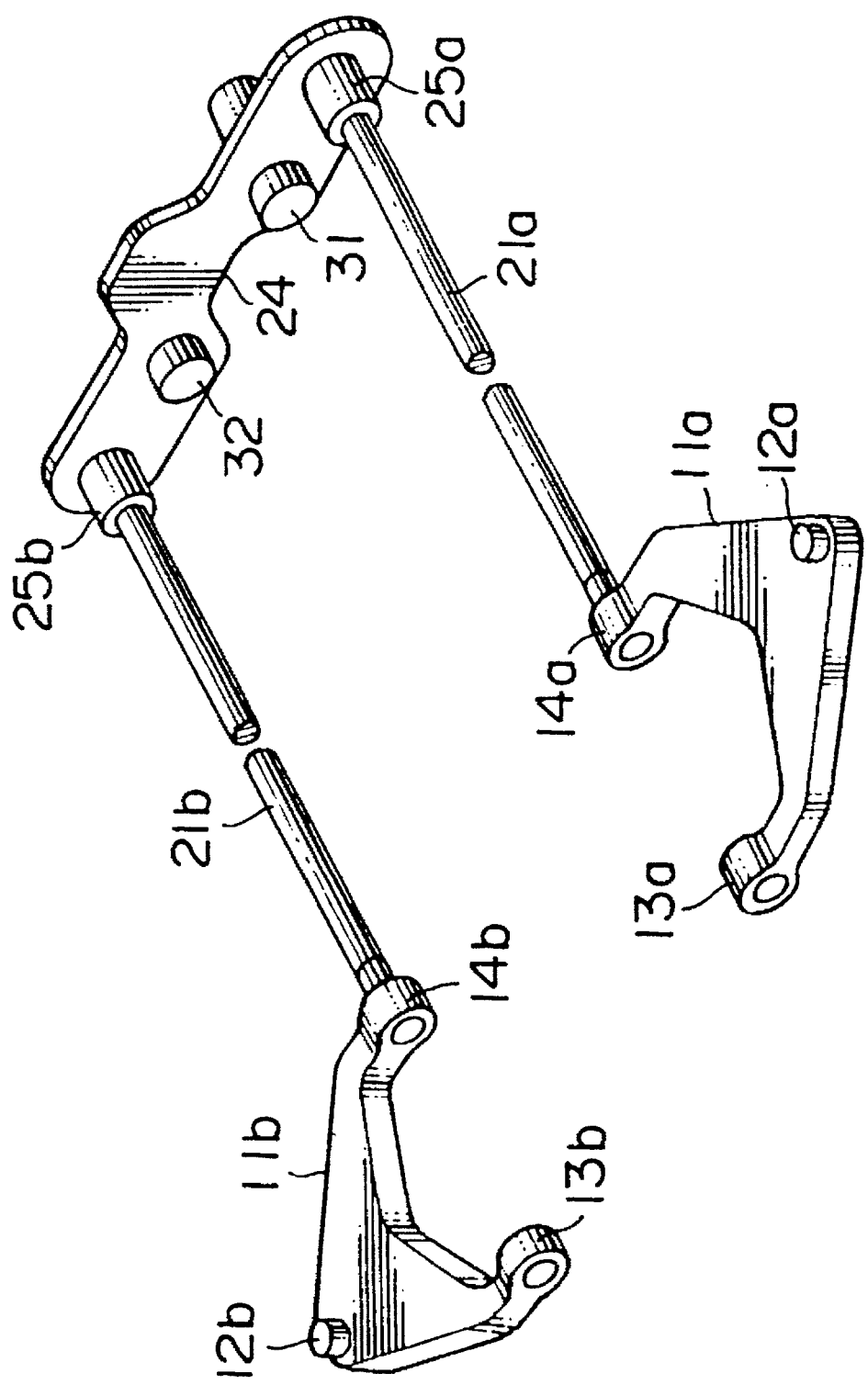
FIG. 4 is a perspective view schematically showing the structure of a suspension system for an automobile according to a third modification of the first embodiment.

FIG. 4 shows a third modification of the first embodiment. The construction of lower arms 11a and 11b of this modification is the same as that of the first embodiment. However, in this modification, a single spring plate 24 is disposed on a cross member of the body. The spring plate 24 extends in a direction nearly perpendicular to the center axes of torsion bars 21a and 21b. Thus, the spring plate 24 extends in the substantially lateral direction of the body. Rear end portions of the two torsion bars 21a and 21b are fixed to both proximal portions of the spring plate 24. The spring plate 24 is fixed to the cross member with two mounting members 31 and 32. The mounting members 31 and 32 are preferably of floating type where they each have a rubber bushing so that the spring plate 24 bends in the substantially longitudinal direction of the body. However, the spring plate 24 may be mounted directly on the cross member with metal pins or the like.

Figure 5:
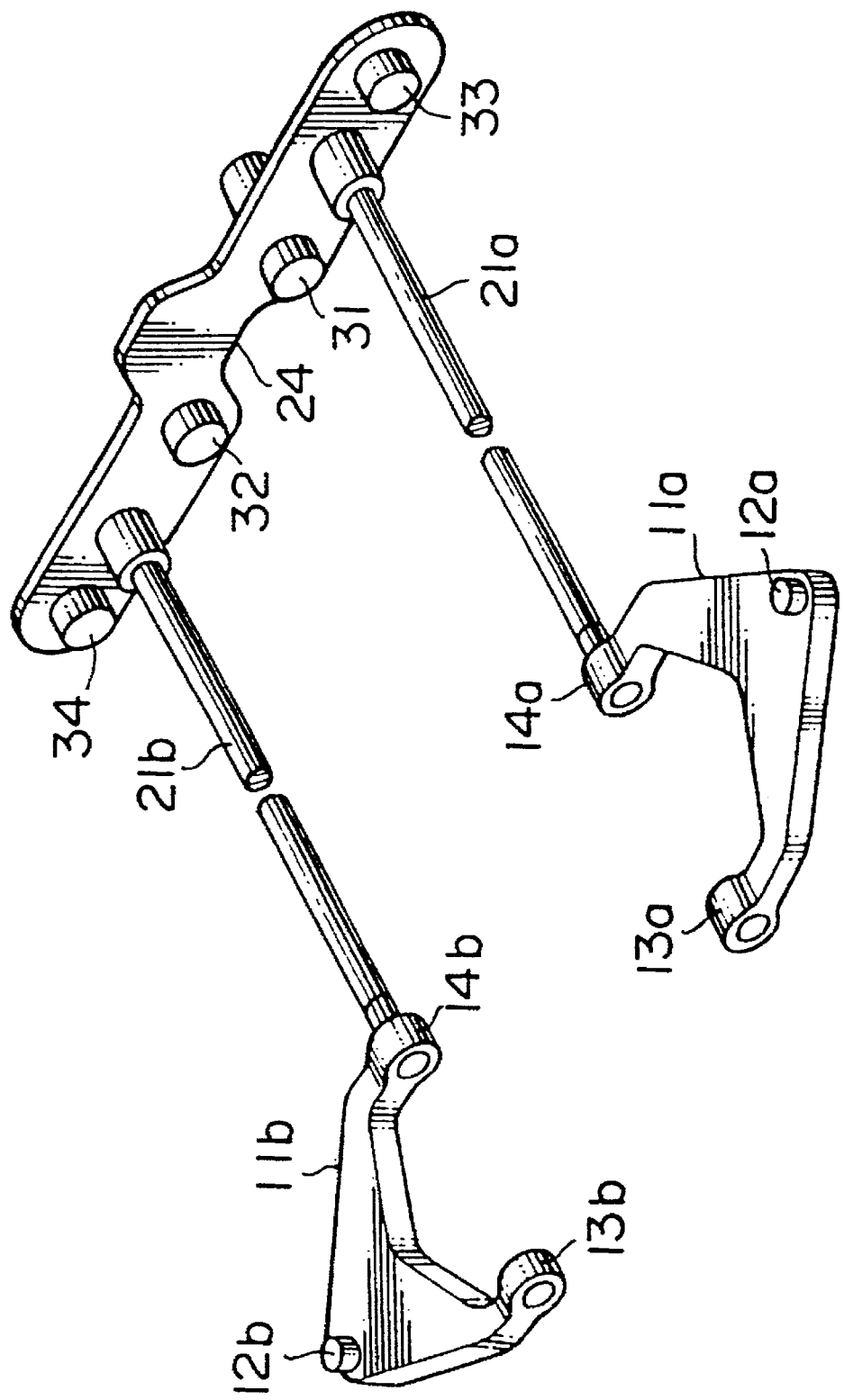
FIG. 5 is a perspective view schematically showing the structure of a suspension system for an automobile according to a fourth modification of the first embodiment.

FIG. 5 shows a fourth modification of the first embodiment. In this modification, as in the third modification shown in FIG. 4, both proximal portions of a spring plate 24 are fixed to rear end portions of torsion bars 21a and 21b, respectively. The both proximal portions of the spring plate 24 are connected to a cross member by mounting members 33 and 34. Thus, the rear end portion of the left torsion bar 21a is disposed between the mounting members 31 and 33. The rear end portion of the right torsion bar 21b is disposed between the mounting members 32 and 34.

In the suspension systems according to the third and fourth modifications shown in FIGS. 4 and 5, when a load is applied thereto in the substantially rear direction of the body, the spring plate 24 elastically deforms. In addition, at this point, the portion between the two mounting members 31 and 32 deforms, thereby cancelling the load applied thereto. Thus, the load applied to the body is reduced. As a result, when a load is applied to the suspension system in the substantially longitudinal direction of the body, the suspension system bends in this direction. Thus, these suspension systems can provide good riding comfort.

In particular, in the modifications shown in FIGS. 4 and 5, the reaction force by the spring plate 24 against the body at the mounting members can be reduced. Thus, so-called floating bushings having rubber bushings as the mounting members 31 to 34 can be used. Therefore, the suspension systems can satisfactorily bend in the substantially longitudinal direction of the body. The bending characteristic in the substantially longitudinal direction of the suspension system which uses a total of four mounting members shown in FIG. 5 is superior to that of the suspension system which uses two mounting members shown in FIG. 4.

In the above-described embodiment and the modifications thereof, the front end portions of the torsion bars 21a and 21b are fixed to the pivot portions 14a and 14b behind the lower arms 11a and 11b, respectively. Thus, the center axes of the pivot portions accord with the respective center axes of the torsion bars. However, even if these axes do not accord with each other, the present invention may be applied. In this case, when the suspension system vertically moves, the front end portions of the torsion bars 21a and 21b move in the substantially vertical direction of the body as the lower arms 11a and 11b rotate. However, since the spring plates 24, 24a, and 24b elastically deform in their twisting directions, an excessive bending stress is not applied to the torsion bars 21a and 21b. Thus, the suspension system smoothly moves in the substantially vertical direction of the body. At this point, the suspension system always moves in the same path. As a result, the riding comfort and steering stability is improved.

Figure 6:
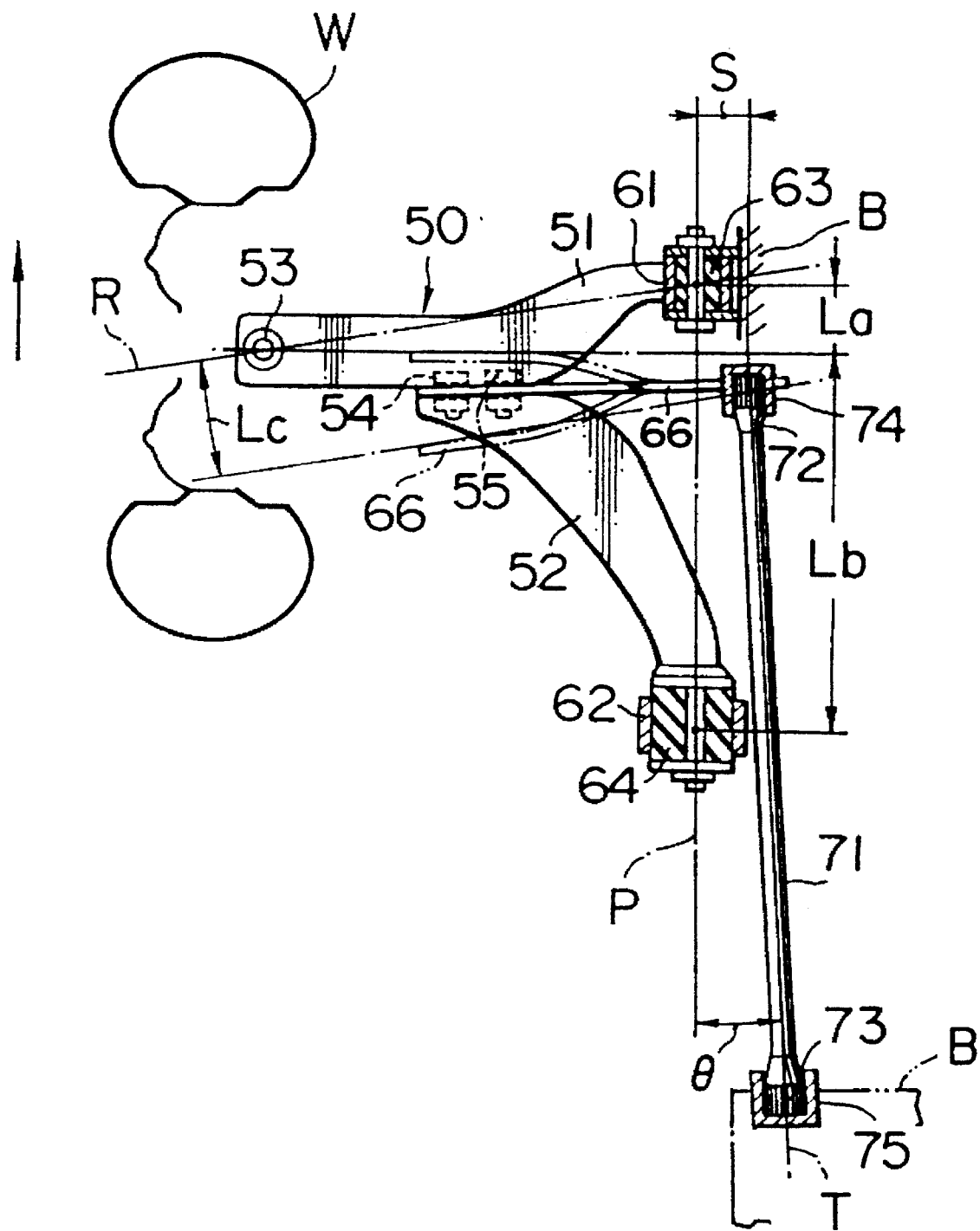
FIG. 6 is a partial plan view showing the structure of a suspension system for an automobile according to a second embodiment of the present invention.
Figure 7:
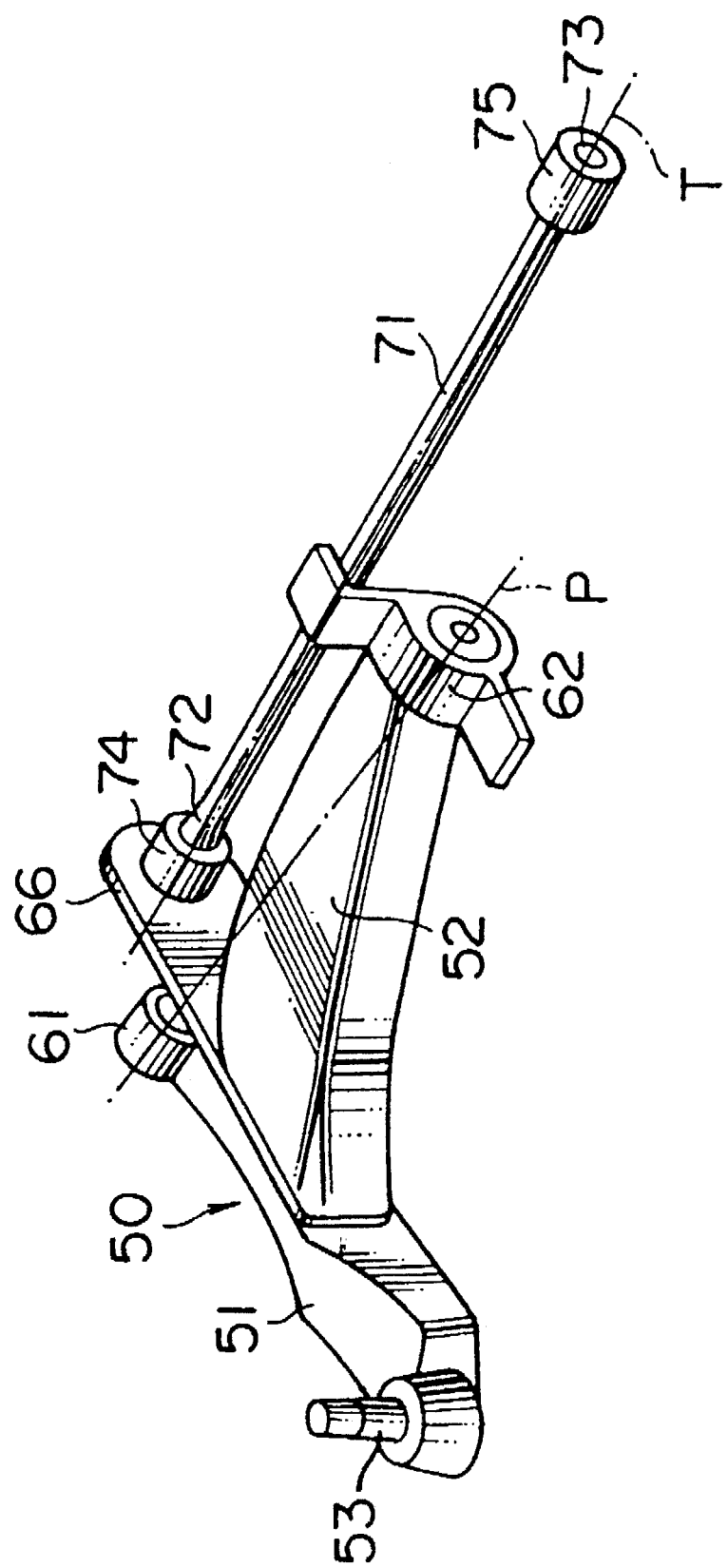
FIG. 7 is a perspective view showing the structure of a suspension system of FIG. 6.

FIGS. 6 and 7 show the construction of a principal portion of a suspension system for an automobile according to a second embodiment of the present invention. In these figures, a suspension arm 50 comprises a first arm portion 51 and a second arm portion 52 which is disposed behind the first arm portion 51. A lower end portion of a knuckle (not shown) which rotatably supports a wheel W is connected to the arm 50 by a ball joint 53. The suspension arm 50 is referred to as a lower arm or lower link. The suspension arm 50 connects the lower end portion of the knuckle and the body. The first arm portion 51 and the second arm portion 52 are connected by connecting elements 54 and 55 which are for example bolts. The suspension arm 50 is an A-letter shaped arm.

The first arm portion 51 has a first pivot portion 61 into which a rubber bushing 53 is fitted. The first arm portion 51 is supported to a body B by the first pivot portion 61. Likewise, the second arm 62 has a second pivot portion 62 into which a rubber bushing 64 is fitted. The second arm portion 52 is supported to the body B by the second pivot portion 62.

The first pivot portion 61 and the second pivot portion 62 are spaced apart from each other in the substantially longitudinal direction of the body B. A pivot axial line P which connects the centers of the first pivot portion 61 and the second pivot portion 62 extends nearly in the substantially longitudinal direction of the body B. Now assume that La denotes the distance between the center of the ball joint 53 and the center of the first pivot portion 61 in the substantially longitudinal direction of the body B. In addition, assume that Lb denotes the distance between the center of the ball joint 53 and the center of the second pivot portion 62 in the substantially longitudinal direction of the body B. At this point, the relation of La<Lb is satisfied. The volume of the rubber bushing 64 is larger than that of the rubber bushing 63. Thus, when a load is applied to the suspension system in the substantially longitudinal direction of the body B, the rubber bushing 64 in the second pivot 62 can more elastically deform than the rubber bushing 63 in the first pivot 61 does.

A proximal portion of a spring plate 66 made of a spring member material is disposed between the first arm portion 51 and the second arm portion 52. Thus, the proximal portion of the spring plate 66 is fixed to the suspension arm 50. The spring plate 56 extends in the substantially lateral direction of the body B. As shown in the figures, the spring plate 66 is connected to the two arm portions 51 and 52 by the bolts 54 and 55. However, the spring plate 66 may be connected to the arm portions 51 and 52 by welding or rivets.

To the distal portion of the spring plate 66, is fixed to a front end portion 72 of a torsion bar 71. A rear end portion 73 of the torsion bar 71 is fixed to the body B. The front end portion 72 of the torsion bar 71 is connected to a sleeve 74 by a fitting element such as a spline. The sleeve 74 and the spring plate 66 are connected by welding or the like so as to fix the front end portion of the torsion bar 71 and the spring plate 66. Likewise, the rear end portion of the torsion bar 71 is connected to a sleeve 75 by a fitting element such as a spline. The sleeve 75 and the body B are connected by welding so as to fix the rear end portion 73 of the torsion bar 71 and the body B.

A center axis T of the torsion bar 71 and the pivot axial line P make an offset angle θ. The center of the first pivot portion 61 and the center of the front end portion 72 of the torsion bar 71 deviate in the substantially lateral direction of the body by a predetermined offset distance S.

As shown in the figures, the front end portion 72 of the torsion bar 71 is mounted on the suspension arm 50 by the spring plate 66 which extends in parallel with the center axis T of the torsion bar 71. Thus, the rigidity of the suspension arm 50 against a load in the substantially longitudinal direction of the wheel W is low, whereas the rigidity of the suspension arm 50 against a load in the substantially vertical direction of the wheel W is high.

Thus, when a load is applied to the wheel W in the substantially longitudinal direction of the body B, the front and rear rubber bushings 63 and 64 deform. Thus, the two arm portions 51 and 52 share the load and thereby the suspension arm 50 deforms in the substantially longitudinal direction of the body B. However, the rigidity of the spring plate 66 in the substantially longitudinal direction of the body B is low. Thus, as shown by two-dot line of FIG. 6, the spring plate 66 deforms in the substantially longitudinal direction of the body B. Therefore, an excessive bending force is not applied to the torsion bar 71. In addition, the torsion bar 71 does not prevent the suspension system from moving or bending in the substantially longitudinal direction of the body B. Thus, the suspension system can provide an excellent riding comfort.

When a load is applied to the wheel W in the substantially lateral direction of the body B, the suspension arm 50 is pivotably supported to the body B by the two pivot portions 61 and 62. Since the pivot portions 61 and 62 do not elastically deform so much in the substantially lateral direction of the body B, satisfactory rigidity against a load in the substantially lateral direction of the body B can be obtained.

When the wheel W moves in the substantially vertical direction of the body, even if the pivot axis P deviates from the center axis T of the torsion bar, there are offset distance S and offset angle θ. Thus, as the front end of the suspension arm 50 moves in the substantially vertical direction of the body B, the spring plate 66 twists. In other words, the spring plate 66 twists so that the surface thereof inclines. Thus, an excessive bending force is not applied to the torsion bar 71. The twisting torque of the torsion bar 71 is transmitted to the suspension arm 50 through the spring plate 66. Therefore, the suspension system smoothly moves in the substantially vertical direction of the body B. Since the suspension system smoothly moves in the same path, excellent riding comfort and steering stability is achieved.

To allow the suspension system to have satisfactory rigidity in the substantially lateral direction of the body B and keep satisfactory bending amount in the substantially longitudinal direction of the body B, La should be much smaller than Lb. Because of the difference of the volumes of the rubber bushings 63 and 64, the first pivot 61 has a high rigidity in the substantially lateral direction of the body B, whereas the second pivot 62 has a low rigidity both in the substantially longitudinal direction and the lateral direction of the body B. As shown in the figures, when the distance Lc between the line R which connects the center of the first pivot 61 and the center of the ball joint 53 and the force acting point of the torsion bar 71 is as short as possible, most of the reaction force of the torsion bar 71 is applied to the first pivot portion 61. Thus, the rigidity in the substantially lateral direction of the body B, the bending amount in the substantially longitudinal direction of the body B, and the vibration tuning are nearly unaffected.

The suspension arm 50 is a lower arm which connects the lower end portion of the knuckle to the body. The upper end portion of the knuckle is connected to the body by for example an I-letter shaped upper arm (not shown). Between the suspension arm 50 shown in the figure or the upper arm and the body, a known shock absorber (not shown) is disposed. However, the suspension arm 50 may be used for an upper arm which connects the upper end portion of the knuckle to the body. The suspension arm 50 shown in the figure supports the left-side front wheel. The right-side front wheel can be supported by the arm in the same construction. In addition, the rear wheels can be also supported by arms basically in the same construction.

Figure 8:
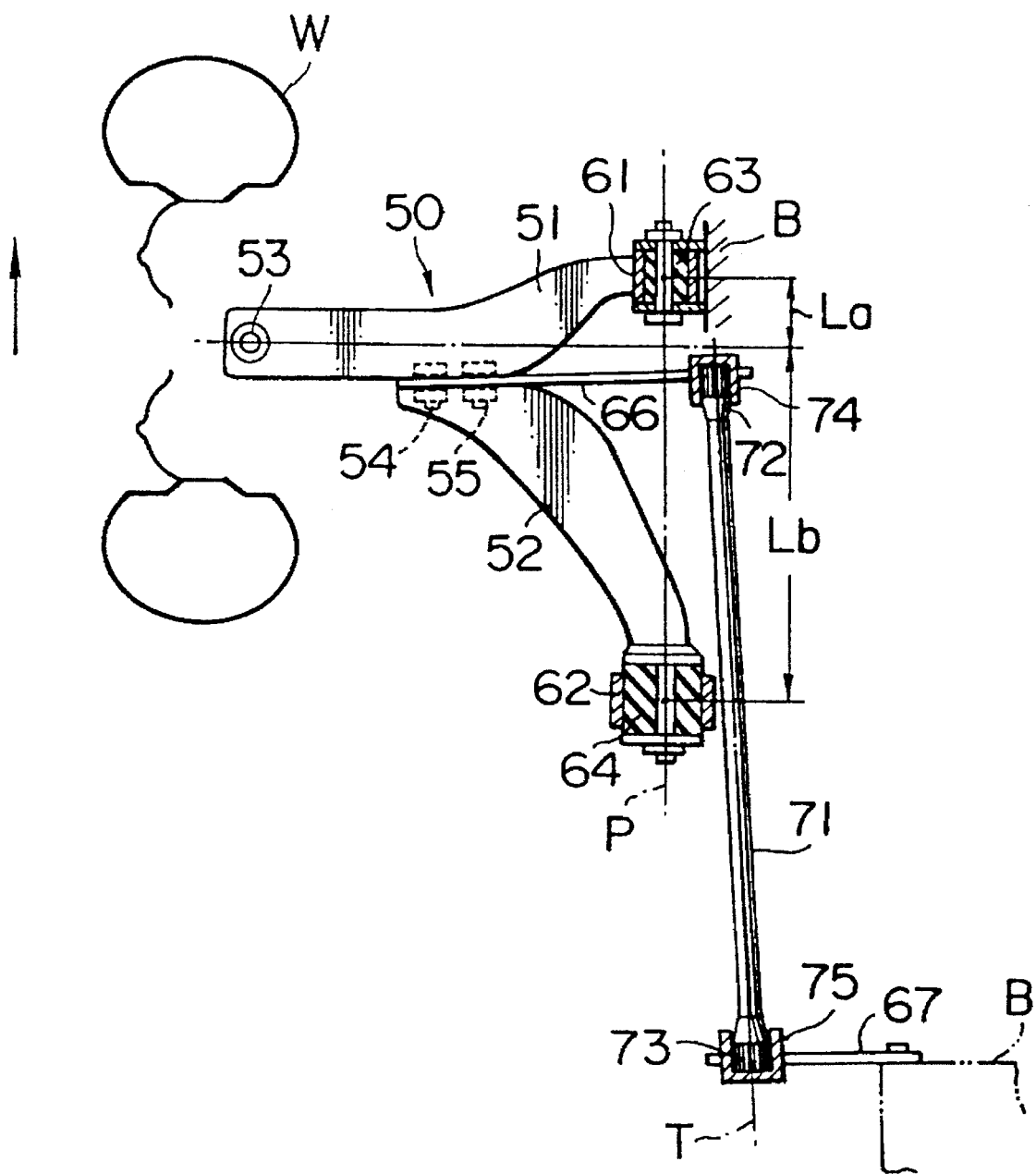
FIG. 8 is a partial plan view showing the structure of a suspension system for an automobile according to a first modification of the second embodiment.
Figure 9:
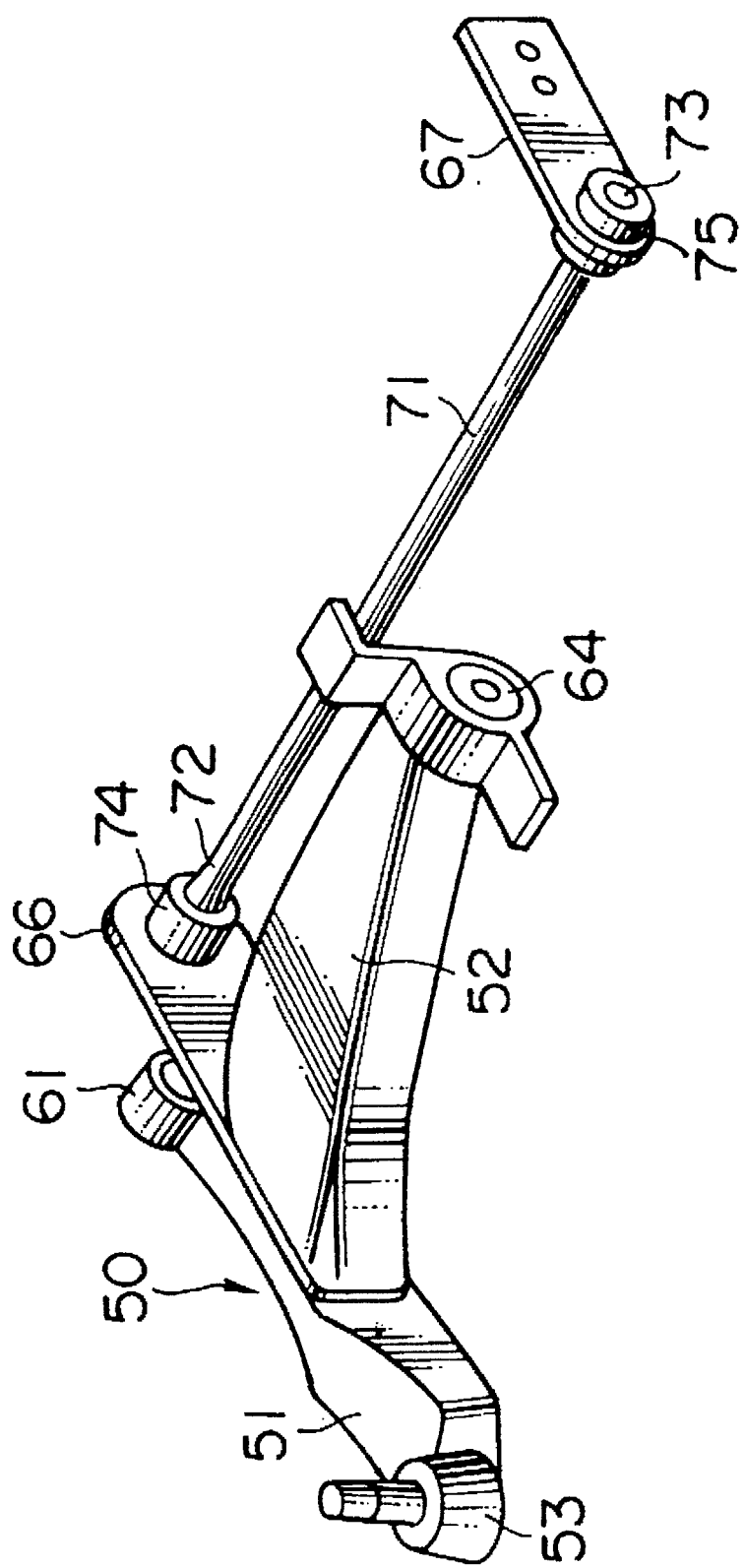
FIG. 9 is a perspective view showing the structure of the suspension arm of FIG. 8.

FIGS. 8 and 9 show the construction of a principal portion of a suspension system according to a first modification of the second embodiment. For the sake of simplicity, the portions in common with the second embodiment are denoted by the same reference numerals.

In the second embodiment, the other end portion 73 of the torsion bar 71 is fixed to the body B through the sleeve 75. In the suspension system according to this modification, the other end portion 73 of the torsion bar 71 is connected to a cross member of a body B by a second spring plate 67. The spring plates 66 and 67 extend in parallel with a center axis T of the torsion bar 71. As in the second embodiment, the spring plates 66 and 67 have a high rigidity in the substantially vertical direction of the body and a low rigidity in the substantially longitudinal direction of the body B. In this modification, when a load is applied to a wheel W in the substantially longitudinal direction of the body B or when the wheel W moves in the substantially vertical direction of the body B, a bending force applied to the torsion bar 71 can be remarkably reduced in comparison with the construction of the second embodiment because the two spring plates 66 and 67 deform.

Figure 10:
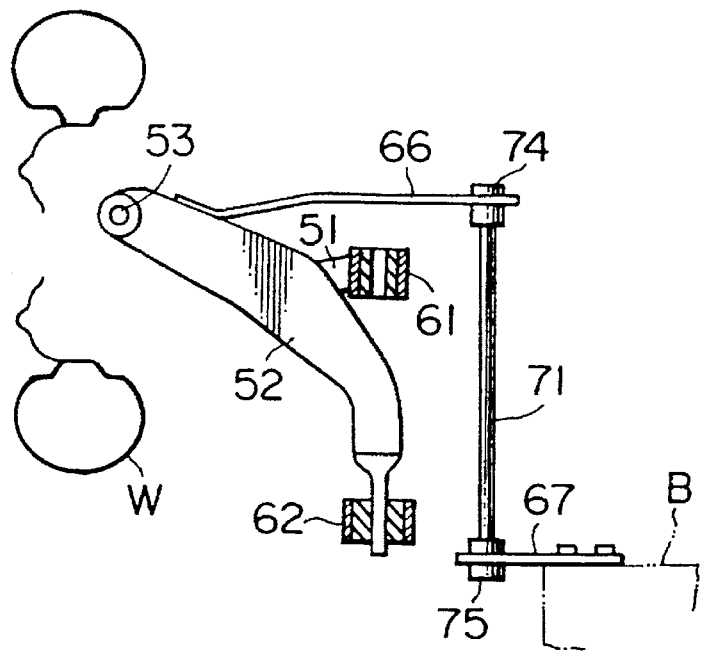
FIG. 10 is a partial plan view showing the structure of a suspension system for an automobile according to a second modification of the second embodiment.

FIG. 10 shows the construction of a suspension system according to a second modification of the second embodiment. In this suspension system, spring plates 66 and 67 are disposed on both end portions of a torsion bar 71. A first arm portion 51 is branched from a second arm portion 52. The first arm portion 51 and the second arm portion 52 are integrally constructed by a means such as welding. A ball joint 53 is disposed at a front end portion of the second arm portion 52. At an end portion of the first arm portion 51, a first pivot portion 61 is disposed. The first spring plate 66 is connected to the second arm portion 52 by a particular means such as welding. A line connecting the first and second pivot portions 61 and 62 extends in a substantially longitudinal direction of the body, the torsion bar 71 extends in parallel with the line, and the spring plate 66 is arranged in front of the first and second arm portions 51 and 52.

Figure 11:
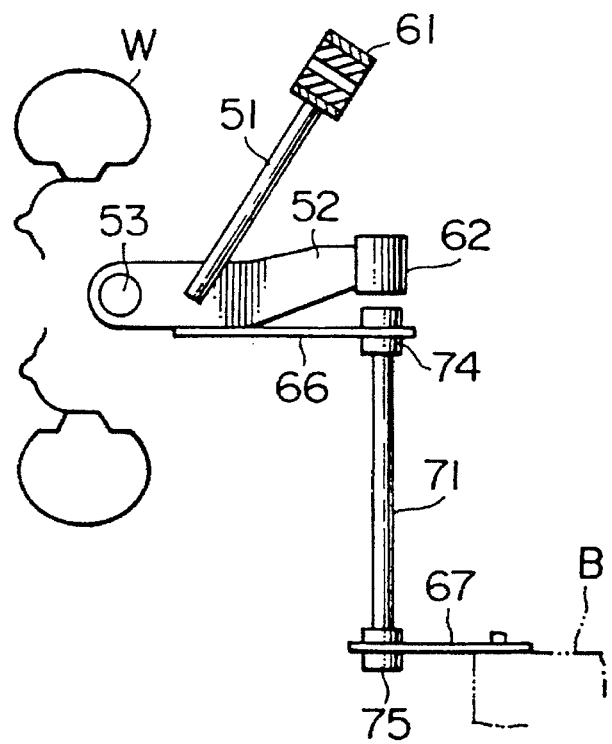
FIG. 11 is a partial plan view showing the structure of a suspension system for an automobile according to a third modification of the second embodiment.

FIG. 11 shows a suspension system according to a third modification of the second embodiment. In this example, a second arm portion 52 extends almost in a substantially lateral direction of a body B. A front end portion of a first arm 51 is connected to a center portion of a second arm portion 52 by welding, bolts, or the like. The first arm 51 inclines in the substantially front direction of the body B. A pivot portion 61 disposed at a rear end portion of the first arm portion 51 inclines in the substantially longitudinal direction of the body B. The suspension system moves in the substantially longitudinal direction of the body B according to the characteristic of a resilient substance of the first pivot portion 61. The first pivot portion 61 is rotatable with an angle substantially in line with the body; the second pivot portion 62 is rotatable in the substantially longitudinal direction of the body; the torsion bar 71 extends in the substantially longitudinal direction; and the spring plate 66 is arranged in front of the first and second arm portions 51 and 52.

Next, a third embodiment of the present invention will be described. The third embodiment relates to a suspension system for an automobile, in particular, to a suspension system having a wheel alignment mechanism.

Figure 12A:
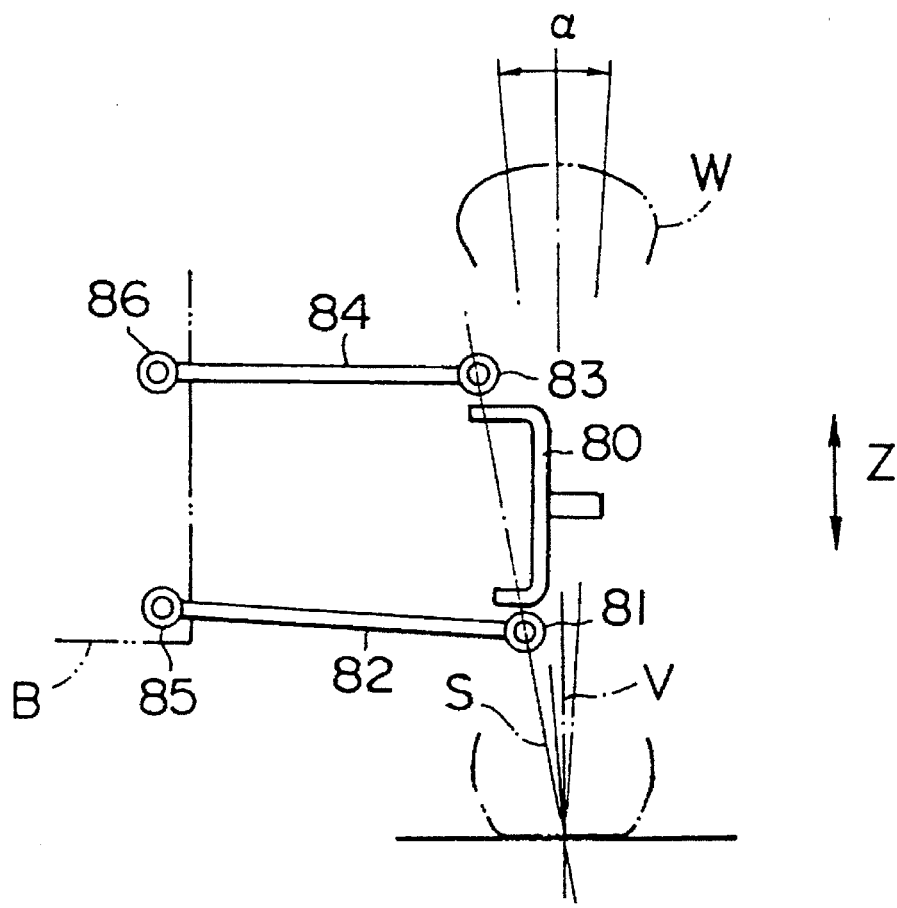
FIG. 12A is a view for explaining a camber angle of a suspension system.
Figure 12B:
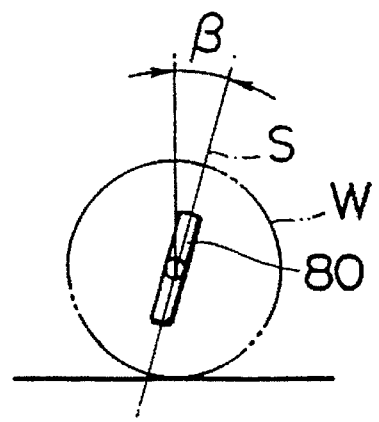
FIG. 12B is a view for explaining a caster angle.

As shown in FIGS. 12A and 12B, a knuckle 80 rotatably supports a wheel W. A lower end portion of the knuckle 80 is connected to a lower arm 82 through a ball joint 81. An upper end portion of the knuckle 80 is connected to an upper arm 84 through a ball joint 83. Proximal portions of the arms 82 and 84 are rotatably mounted on a body B. In the case of a front wheel, when the body B is turned, the wheel W is turned about a line connecting the centers of the upper and lower ball joints 81 and 83 (namely, a turning center axis or a king pin axis S). When the body B is viewed from the front, the angle made by the center plane of the wheel W and the vertical plane V is referred to as a camber angle α. The camber angle α varies according to the inclined angle of the king pin axis S in the substantially lateral direction of the body B. This camber angle affects the steering force.

As shown in FIG. 12B, when the wheel W is viewed from a side, the inclined angle of the king pin axis S in the substantially longitudinal direction of the body B is referred to as a caster angle β. This caster angle affects the direction holding force of the wheel W. The height of the body B is given by the position in the substantially vertical direction (Z direction) of the wheel W to the body B.

After the automobile is assembled, the height of the body B and the wheel alignment such as camber angle can be adjusted so as to securely provide steering stability thereof.

An object of the third embodiment is to provide a suspension system which has both a torsion bar movable in a substantially longitudinal direction of a body and wheel alignment, such as camber angle and caster angle, and body height adjustment mechanism.

Figure 13:
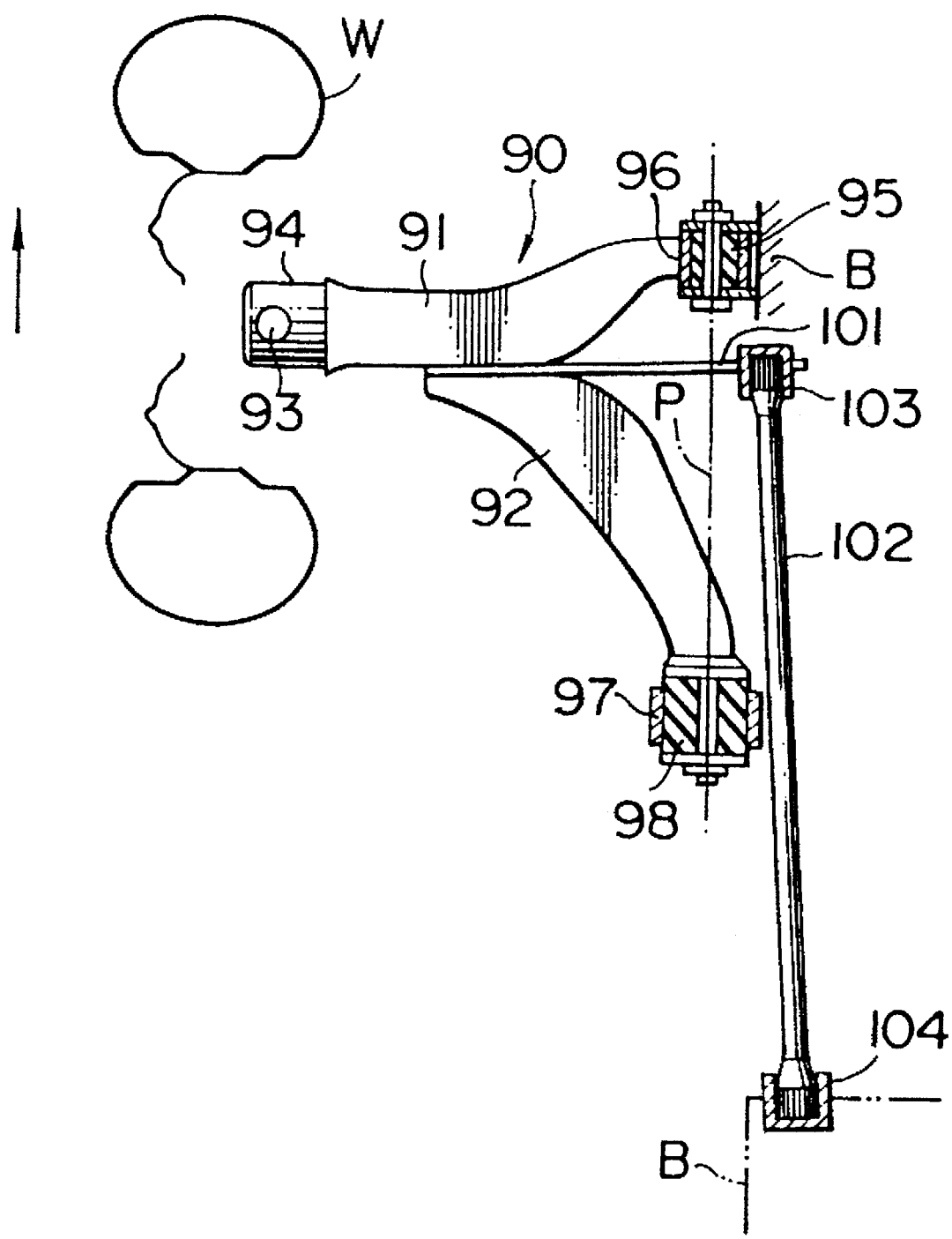
FIG. 13 is a plan view showing the structure of a suspension body of a suspension system according to a third embodiment of the present invention.
Figure 14:
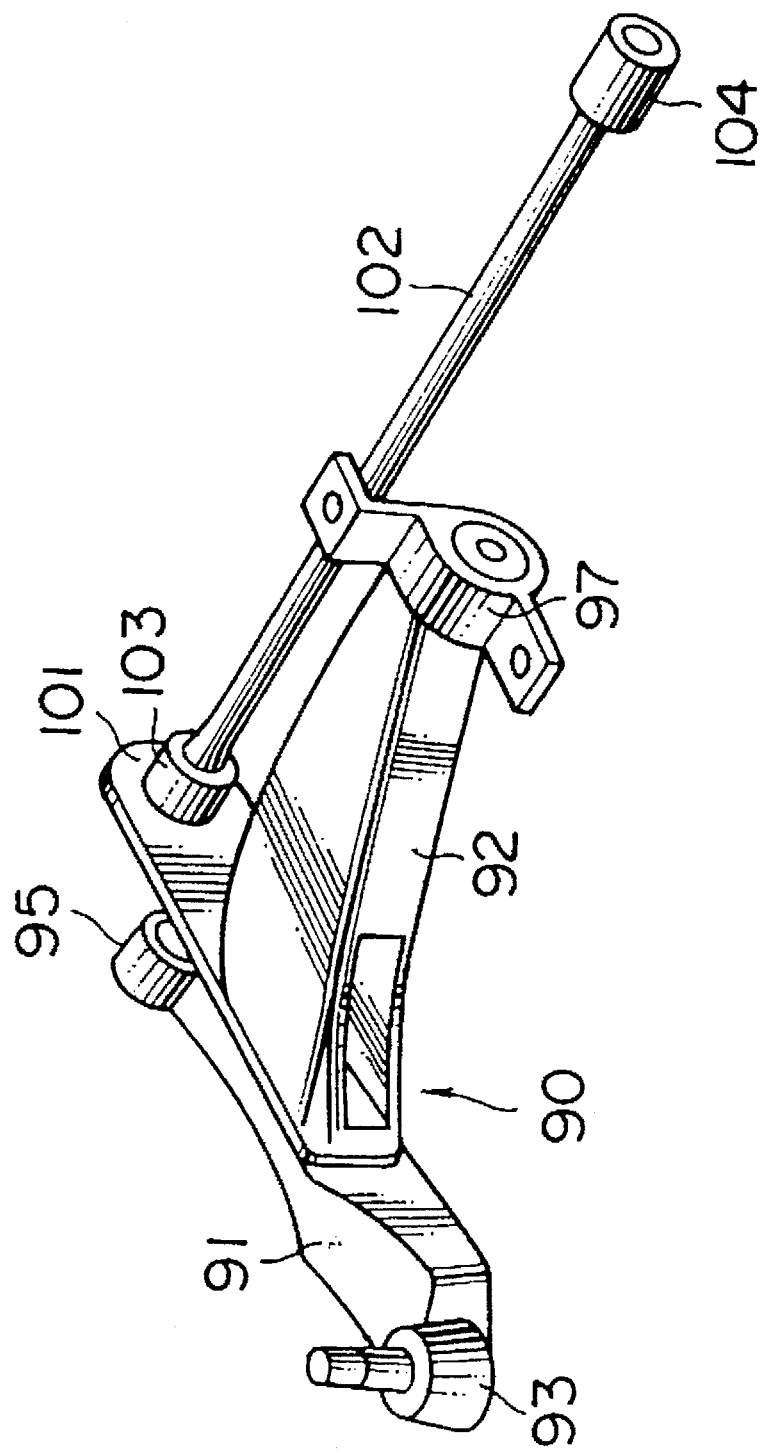
FIG. 14 is a perspective view showing the structure of the suspension body of FIG. 13.

FIGS. 13 and 14 show a principal portion of a suspension system for an automobile according to a third embodiment of the present invention.

In these figures, a suspension arm 90 comprises a first arm portion (front member) 91 and a second arm portion (rear member) 92. The second arm portion 92 is disposed behind the first arm portion 91. A lower end portion of a knuckle (not shown) which rotatably supports a wheel W is connected to the arm 90 by a ball joint (connecting portion) 93. The suspension arm 90 is referred to as a lower arm or lower link. The suspension arm 90 connects the lower end portion of the knuckle with the body. Thus, the suspension arm 90 accords with the lower arm 82 of the suspension system shown in FIG. 12. The first arm portion 91 and the second arm portion 92 are threaded as will be described later. The suspension arm 90 is a letter-A shaped arm. A front end portion of the first arm portion 91 is threaded to a joint holder 94 as will be described later. The joint holder 94 constructs the first arm portion 91. The ball joint 93 is mounted on the joint holder 94.

The first arm portion 91 is provided with a first pivot portion 95 in which a rubber bushing 96 is fitted. The first arm portion 91 is supported by the first pivot portion 95. Likewise, the second arm portion 92 is provided with a second pivot portion 97 in which a rubber bushing 98 is fitted. The second arm portion 92 is supported by the second pivot portion 97. Thus, the first pivot portion 95 and the second pivot portion 97 are spaced apart in a substantially longitudinal direction of the body B. A pivot axial line P which connects the centers of the first pivot portion 95 with the second pivot portion 97 extends in the substantially longitudinal direction of the body B. The volume of the rubber bushing 96 is larger than that of the rubber bushing 98. Thus, when a load is applied to the suspension system, the rubber bushing 98 in the second pivot 97 more elastically deforms than the rubber bushing 96 in the first pivot 95 does.

An end portion of a spring plate 101 made of a leaf spring member is disposed between the first arm portion 91 and the second arm portion 92. Thus, the proximal portion of the spring plate 101 is fixed to the suspension arm 90. The spring plate 101 extends in the substantially lateral direction of the body B. The other proximal portion of the spring plate 101 is fixed to a front end portion of a torsion bar 102. A rear end portion of the torsion bar 102 is fixed to the body B. The front end portion of the torsion bar 102 is spline-connected to a sleeve 103. By welding the sleeve 103 and the spring plate 101, the spring plate 101 is fixed to the front end portion of the torsion bar 102. Likewise, a sleeve 104 is spline-connected to the rear end portion of the torsion bar 102. By welding the sleeve 104 and the body B, the rear end portion of the torsion bar 102 is fixed to the body B.

Figure 15:
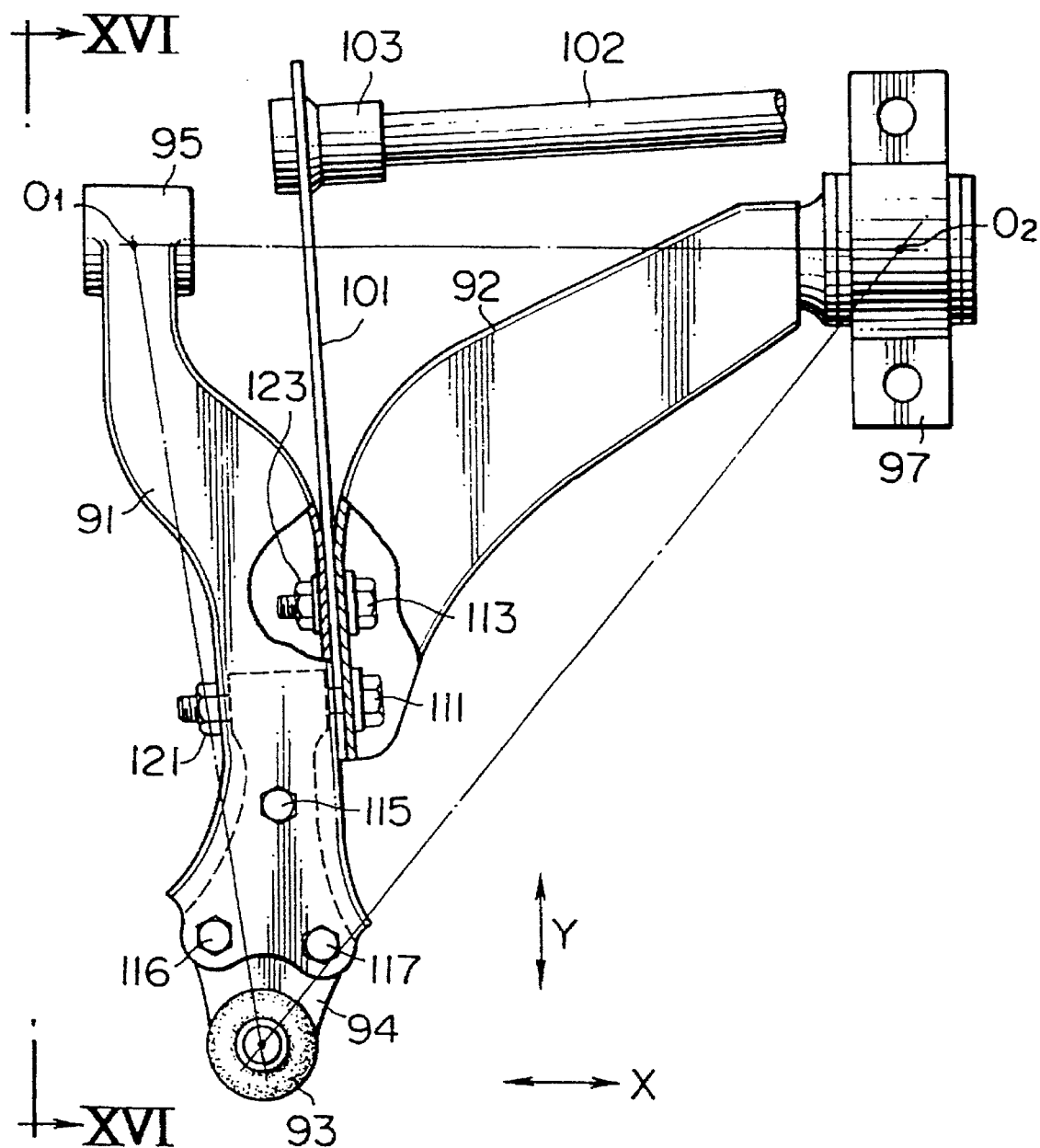
FIG. 15 is an enlarged plan view showing a principal portion of FIG. 13.

As shown in FIG. 15, the spring plate 101 is disposed between the first arm portion 91 and the second arm portion 92. In addition, the first arm portion 91, the second arm portion 92, and the spring plate 101 are integrally connected with a total of three bolts 111, 112, and 113.

The joint holder 94 is integrally connected to the first arm portion 91 with the bolt 111 and three other bolts 115, 116, and 117.

FIGS. 17A, 17B, and 17C, show a principal portion of a suspension system where the suspension system according to the third embodiment shown in FIGS. 13 to 16 is provided with a body height adjustment mechanism. In FIGS. 17A to 17C, three bolts 111 to 113 which connect a first arm portion 91, a second arm portion 92, and a spring plate 101 are enlarged. The first arm portion 91 and the second arm portion 92 are formed by bending a steel material. The interior of these first arm portion 91 and second arm portion 92 are hollow. The first arm portion 91 and the second arm portion 92 have openings according to these bolts. Thus, these bolts can be inserted from the outside into the openings formed on the first arm portion 91 and the second arm portion 92.

The bolt 111 passes through the first arm portion 91. In addition, the bolt 111 passes through the front end portion of the second arm portion 92 and a proximal portion of the spring plate 101. The bolt 111 extends in the substantially longitudinal direction of the body B. The bolt 111 and a nut 121 which is thread onto the front end portion thereof construct a reference thread member. Holes for the arm portions 91 and 92 and the spring plate 101 through which the bolt 111 passes accord with the outer circumference of the bolt 111. The two bolts 112 and 113 are mounted on a circumference G with the same radius of curvature as the bolt 111. The bolts 112 and 113 are mounted nearly in parallel with the bolt 111. By the bolts 112 and 113, the first arm portion 91, the second arm portion 92, and the spring plate 101 are connected.

The bolt 112 and a nut 122 which is thread onto the front end thereof construct a cam thread member. The bolt 112 on the nut 122 is tightened by a tool inserted from an opening formed on the second arm portion 112. The bolt 112, which is the cam thread member, is fit to circular holes 131 and 132 which accord with the center of the bolt 112 formed on the first and second arm portions 91 and 92. The bolt 112 has a drive cam portion 112a which is eccentric from the center thereof. The drive cam portion 112a is engaged with a follower cam portion 133 formed on the spring plate 101. The follower cam portion 133 is formed of an oval hole which extends in the radial direction R connecting the center of the bolt 111 and the center of the bolt 112, namely in a direction perpendicular to the circumference G.

Figure 16:
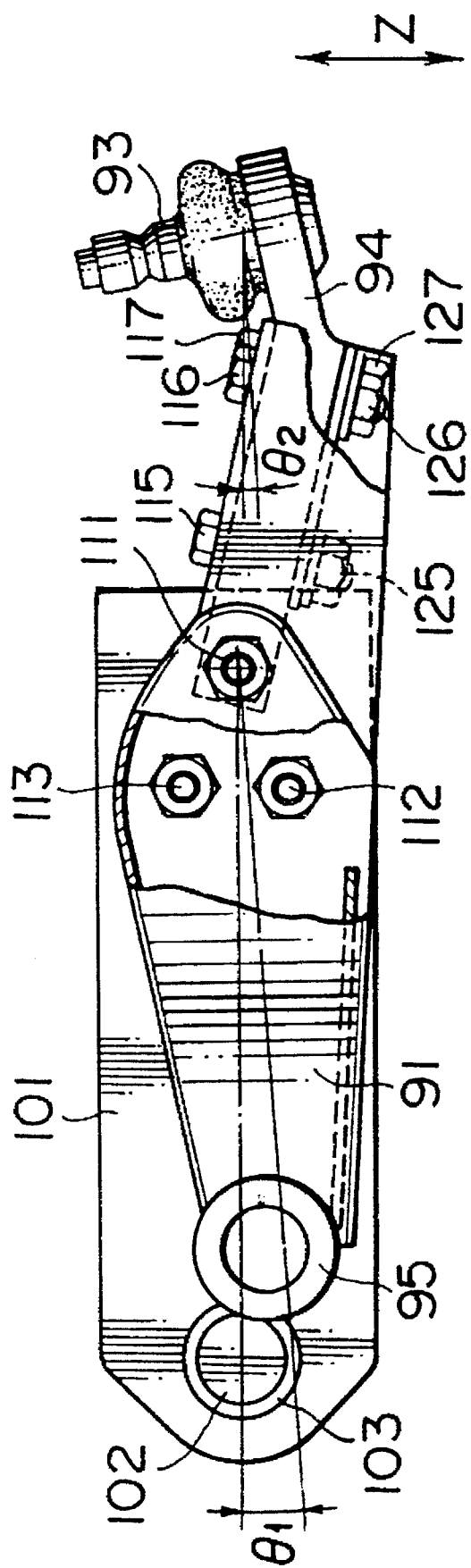
FIG. 16 is a side view taken along line XVI—XVI of FIG. 15.

The bolt 113 is a reinforcement bolt. The bolt 113 passes through circular holes formed on the first arm portion 91 and the second arm portion 92. In addition, as shown in the figure, the bolt 113 passes through an oval hole 134 which extends in the direction of the circumference G of the spring plate 101. Thus, while the nuts 121, 122, and 123 which are thread onto the three bolts 111, 112, and 113 are being loosened, when the nut 112 as the cam thread member is rotated, a proximal portion of the spring plate 101 connected to the torsion bar 102 vertically deforms about the bolt 111. Thus, as shown in FIG. 16, the spring plate 101 vertically rotates about the bolt 111 for an angle θ1. Therefore, the proximal portion of the spring plate 101 vertically deforms about the ball joint 93 for an angle θ2. The ball joint 93 vertically deforms against the body. Therefore, the height of the body is adjusted. After an automobile has been assembled, when the wheel alignment is performed, the height of the body can be adjusted. By tightening the nuts, the adjustment is completed. The bolt 112 and the bolt 113 may be used for the reinforcement bolt and the cam thread member, respectively.

Figure 18C:
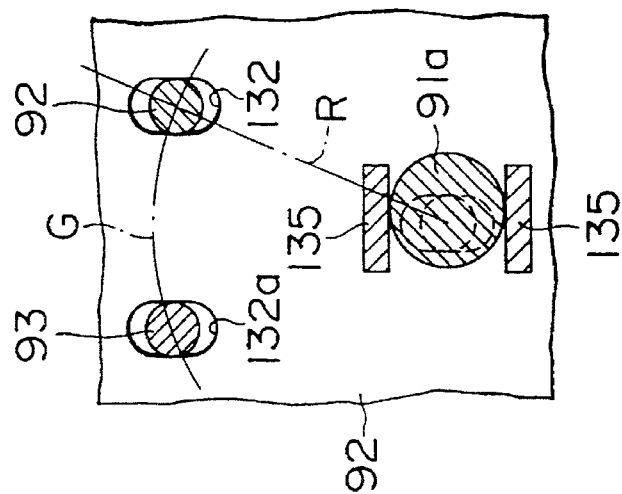
FIG. 18C is a sectional view taken along line XVIIIC—XVIIIC of FIG. 18B.
Figure 18B:
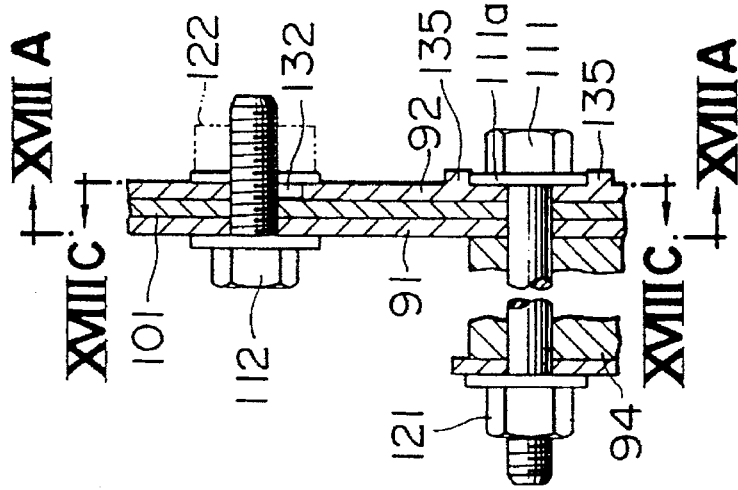
FIG. 18B is a sectional view taken along line XVIIIB—XVIIIB of FIG. 18A.
Figure 18A:
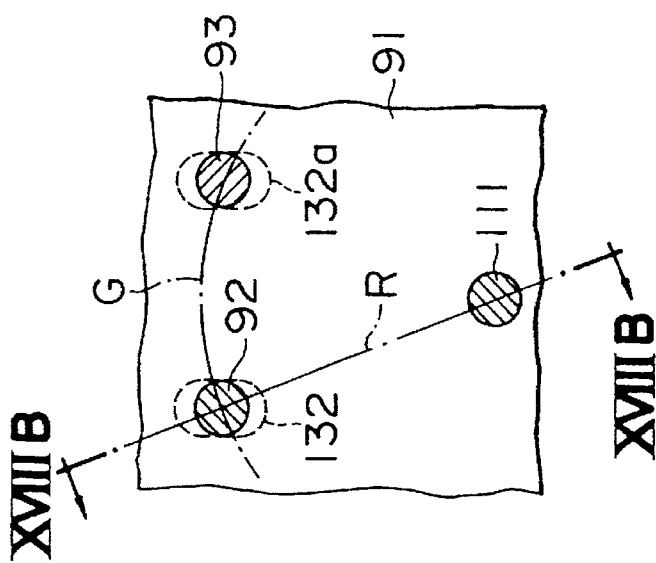
FIG. 18A is a sectional view taken along line XVIIIA—XVIIIA of FIG. 18B.

FIGS. 18A, 18B, and 18C show a principal portion of a suspension system having a wheel caster angle adjustment mechanism. A bolt 111 and a nut 121 which is thread thereto construct a cam thread member which tightens a first arm portion 91, a second arm portion 92, and a spring plate 101. The bolt 111 has a drive cam portion 111a which is eccentric to the center thereof. The second arm portion 92 has two follower cam portions 135 which are engaged with the drive cam portion 111a. The follower cam portions 135 are opposed in a substantially lateral direction of a body. Two bolts 112 and 113, which are disposed in parallel with the cam thread member 111, and nuts 122 and 123 which are thread thereto construct a tightening thread member. The bolts 112 and 113 pass through oval holes 132 and 132a formed on the second arm portion 92. The oval holes 132 and 132a extend in the substantially lateral direction of the body. The bolts 112 and 113 are fit to circular holes formed on the first arm portion 91 and the spring plate 101, respectively. Thus, while the three bolts 111 to 113 are being loosened, when the bolt 111 as the cam thread member is rotated, the position of the second arm portion 92 to the first arm portion 91 in the lateral direction of the body varies as shown by arrow Y of FIG. 15. In the figure, the positions of the center $O_1$ of the first pivot portion 95 and the center $O_2$ of the second pivot portion 97 against the body do not change. Thus, the front end portion of the first arm portion 91, namely the position of the ball joint 93, moves in the substantially longitudinal direction X of the body. As a result, the caster angle of the wheel is adjusted. After this adjustment is completed, the nuts are tightened.

Figure 19A:
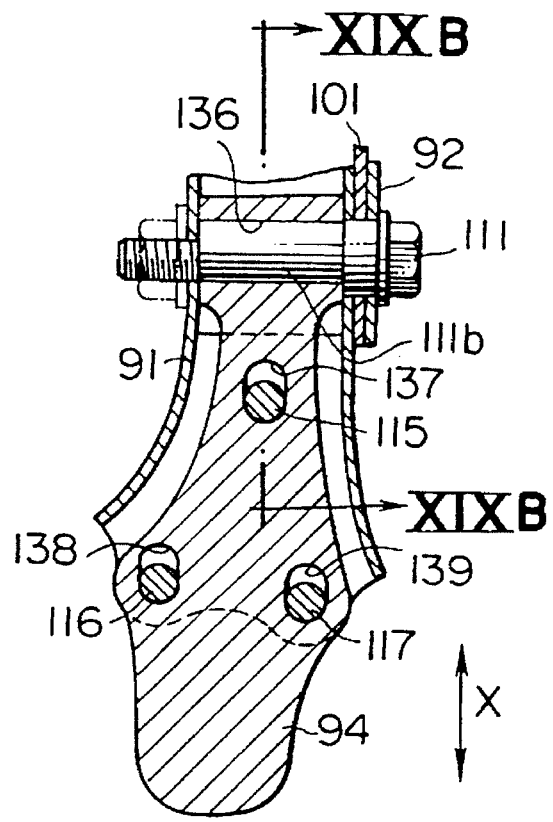
FIG. 19A is a sectional view taken along line XIXA—XIXA of FIG. 19B.
Figure 19B:
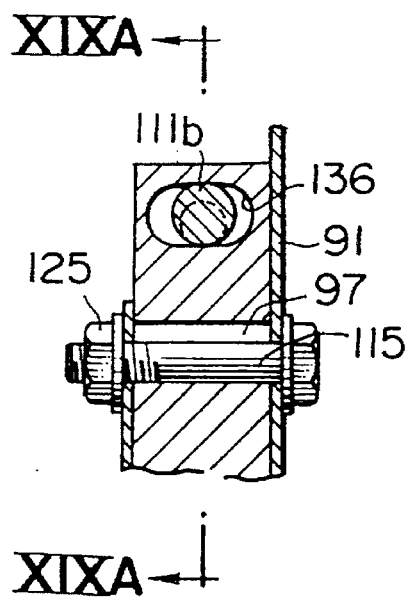
FIG. 19B is a sectional view taken along line XIXB—XIXB of FIG. 19A.

FIGS. 19A and 19B show a principal portion of a suspension system having a wheel camber angle adjustment mechanism. The figures show a portion where a joint holder 94, first and second arm portions 91 and 92, and a spring plate 101 are connected to each other. These portions are connected by a cam thread member which is constructed of a bolt 111 and a nut 121 thread thereto. The bolt 111 has a drive cam portion 111b which is eccentric to the center thereof. The drive cam portion 111b is formed on a joint holder 94. The drive cam portion 111b passes through a follower cam portion 136 which is an oval hole extending in the substantially vertical direction of the body.

On the other hand, bolts 115 to 117 extend in a direction nearly perpendicular to the bolt 111, namely in the substantially vertical direction of the body. The bolts 115 and 117 and nuts 125 to 127 which are thread thereto constitute a tightening thread member. The bolts 115 to 117 pass through oval holes 137 to 139 formed on the joint holder 94. The oval holes 137 to 139 extend in the lateral direction of the body. Thus, while the nuts 121 and 125 to 127 are being loosened, when the bolt 111 as the cam thread member is rotated, the drive cam portion 111b and the follower cam portion 136 are engaged with each other. Thus, the joint holder 94 deforms in the substantially lateral direction of the body. As a result, the camber angle of the wheel can be adjusted. Thereafter, by tightening all the nuts, the adjustment is completed.

In the embodiment shown in FIGS. 19A and 19B, the follower cam portion 136 is formed on the joint holder 94. However, the follower cam portion 136 may be formed on the first arm portion 91, the second arm portion 92, and the spring plate 101. At this point, the follower cam portion 66 is engaged with the drive cam portion 111b. In this case, the joint holder 94 is fit to a portion which is not eccentric to the bolt 111. As the bolt 111 is rotated, the joint holder 94 deforms in the lateral direction of the body against the first arm portion 91. Thus, the camber angle of the wheel can be adjusted.

FIGS. 20A, 20B, 20C, and 20D show a principal portion of a suspension system having a mechanism which can adjust the overall body height, caster angle and camber angle of a wheel. A first arm portion 91, a second arm portion 92, a spring plate 101, and a joint holder 94 are connected to each other by a first cam thread member. The first cam thread member is constructed of a bolt 111 and a nut 121 which is threaded thereto. The bolt 111 extends in a substantially longitudinal direction of a body. On a circumference G with the same radius of curvature from the center of the bolt 111, two bolts 112 and 113 are mounted nearly in parallel with the bolt 111. By these bolts 112 and 113, the first arm portion 91, the second arm portion 92, and the spring plate 101 are tightened to each other.

A bolt 112 and a nut 122 which is threaded onto the front end thereof construct a second cam thread member. The bolt 112 is fit to a circular hole 131 formed on the first arm portion 91. As in the embodiment shown in FIGS. 17A, 17B, and 17C, the bolt 112 has a drive cam portion 112a. The drive cam portion 112 is engaged with a follower cam portion 133 formed on the spring plate 101. As in the embodiment shown in FIGS. 17A, 17B, and 17C, a reinforcement bolt 113 is fit to a circular hole formed on the first arm portion 91. In addition, the reinforcement bolt 113 passes through an oval hole 134 formed on the spring plate 101. In the mechanism shown in FIG. 20, the construction of the spring plate 101 is the same as that shown in FIG. 17. Thus, while the nuts 121, 122, and 123 are being loosened, when the bolt 111 is rotated, the body height can be adjusted.

Figure 20C:
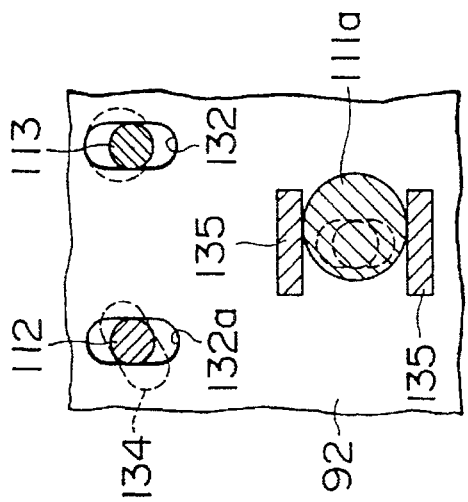
FIG. 20C is a sectional view taken along line XXC—XXC of FIG. 20B.
Figure 20D:
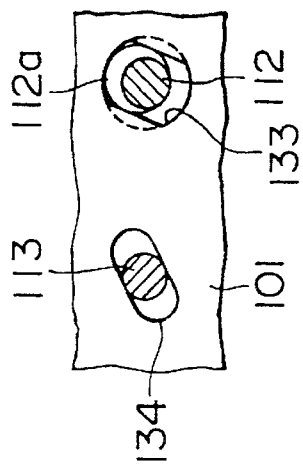
FIG. 20D is a sectional view taken along line XXD—XXD of FIG. 20B.
Figure 20B:
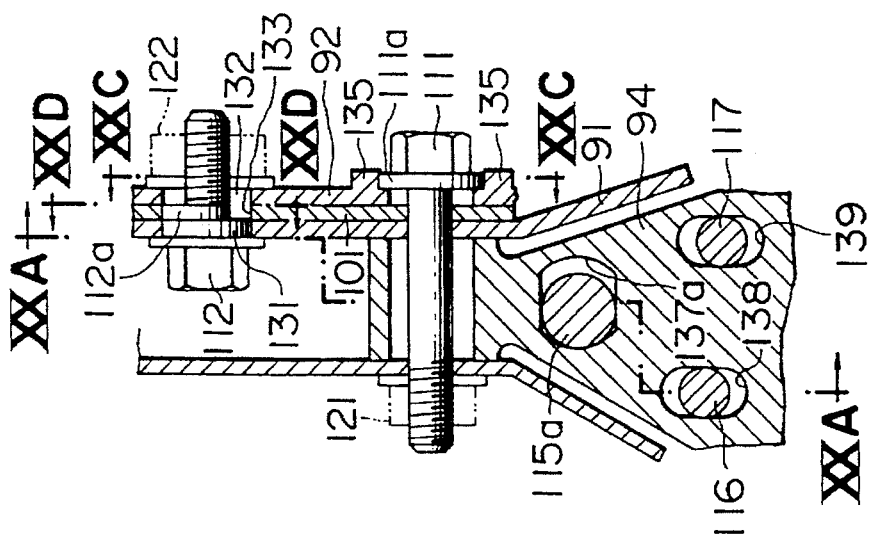
FIG. 20B is a sectional view taken along line XXB—XXB of FIG. 20A.
Figure 20A:
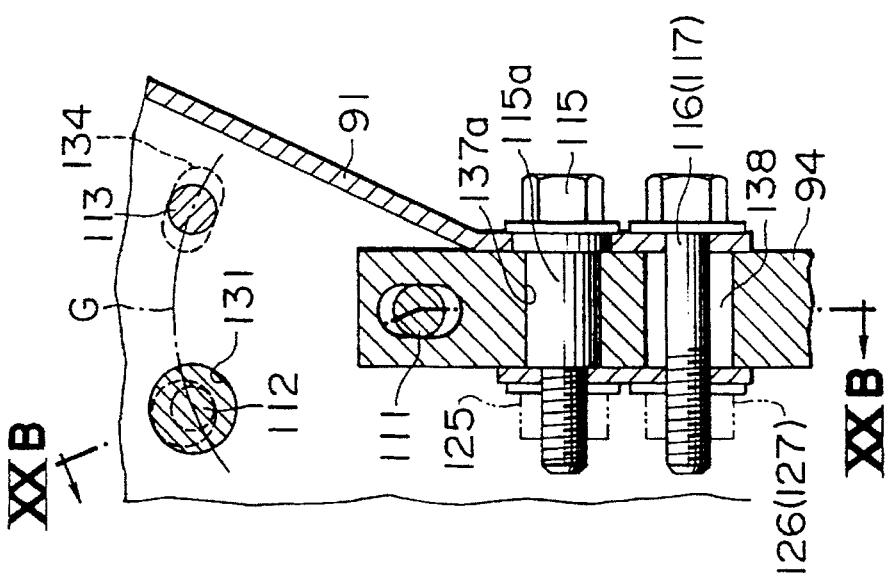
FIG. 20A is a sectional view taken along line XXA—XXA of FIG. 20B.

The bolt 111 which constructs the first cam thread member has a drive cam portion 111a which is eccentric to the center axis thereof as in the embodiment shown in FIG. 18. On the second arm portion 92, two follower cam portions 135 which are engaged with the drive cam portion 111a are opposed in the substantially lateral direction of the body. On the second arm portion 92, as shown in FIG. 20C, oval holes 132 and 132a which extend in the substantially lateral direction of the body are formed. The bolts 112 and 113 pass through the oval holes 132 and 132a, respectively. Thus, while the three bolts 111 to 113 are being loosened, when the bolt 111 as the first cam thread member is rotated, a front end portion of the second arm portion 92 deforms in the substantially lateral direction of the body against the first arm portion 91 as in the embodiment shown in FIG. 18. Thus, the caster angle of the wheel can be adjusted.

A bolt 115 is one of three bolts which connect the joint holder 94 to the first arm portion 91. The bolt 115 and a nut 125 which is threaded thereto constitute a third cam thread member. The bolt 115 has a drive cam portion 115a. The drive cam portion 115a is fit to an oval hole 137a formed on the joint holder 94. The oval hole 137a extends in the substantially longitudinal direction of the body. The other two bolts 116 and 117 are tightening bolts. The bolts 116 and 117 pass through oval holes 138 an 139 which extend in the substantially lateral direction of the body and are formed on the joint holder 94. Thus, while the three bolts 115 to 117 are being loosened, when the bolt 115 as the third cam thread member is rotated, the joint holder 94 deforms in the substantially lateral direction of the body. Thus, a ball joint 93 disposed at a front end portion of the joint holder 94 deforms in the substantially lateral direction of the body. Thus, the camber angle of the wheel can be adjusted.

After the body height, the caster angle, and the camber angle have been adjusted, by tightening the bolts and nuts, the adjustment is completed.

Figure 21C:
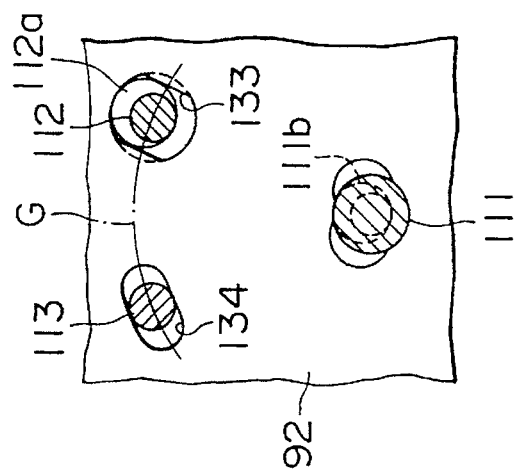
FIG. 21C is a sectional view taken along line XXIC—XXIC of FIG. 21B.
Figure 21B:
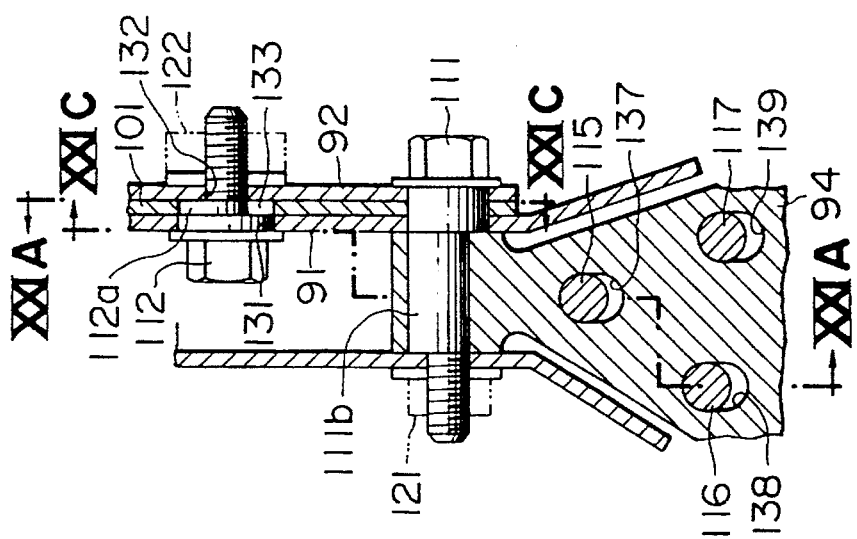
FIG. 21B is a sectional view taken along line XXIB—XXIB of FIG. 21A.
Figure 21A:
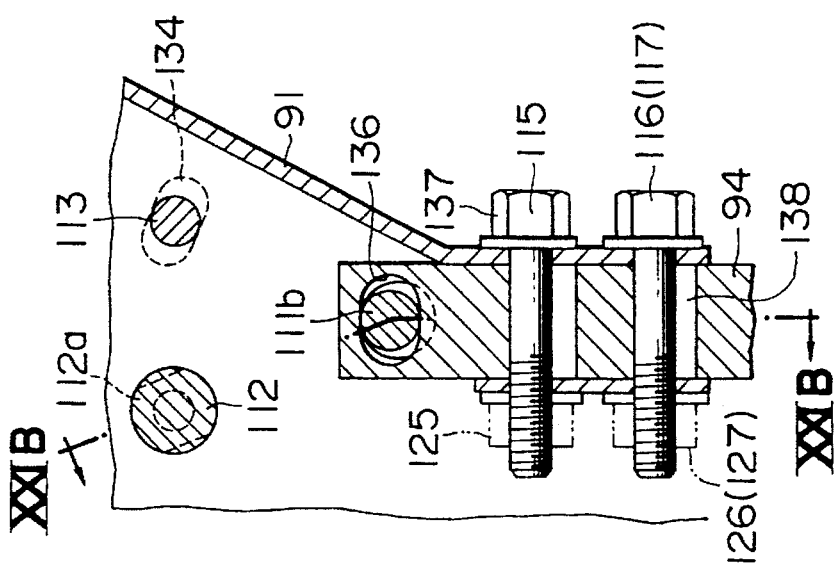
FIG. 21A is a sectional view taken along line XXIA—XXIA of FIG. 21B.

FIGS. 21A, 21B, and 21C show a principal portion of a suspension system having a mechanism which can adjust both body height and camber angle of a wheel. A bolt 41 extends in a substantially longitudinal direction of a body and connects a first arm portion 91, a second arm portion 92, and a spring plate 101. The bolt 111 and a nut 51 which is threaded thereto constitute a first cam thread member. As in the embodiment shown in FIG. 17, the first arm portion 91, the second arm portion 92, and the spring plate 101 are connected by a bolt 112 and a tightening bolt 113. The bolt 112 constitute a second cam thread member. As in the embodiment shown in FIG. 17, the bolt 112 has a drive cam portion 112a. The spring plate 101 has an oval hole 63 as a follower cam portion. Thus, while the three bolts 111 to 113 are being loosened, when the bolt 112 as the second cam thread member is rotated, the body height can be adjusted.

As in the embodiment shown in FIG. 19, the bolt 111 as the first cam thread member has a drive cam portion 111b which is eccentric to the center thereof. The drive cam portion 111a is fit to an oval hole 136 formed on a joint holder 94. The oval hole 136 extends in a substantially vertical direction of the body. The oval hole 136 is a follower cam portion. As in the embodiment shown in FIG. 19, three bolts 115 to 117 which connect the first arm portion 91 and the joint holder 94 pass through oval holes 137 to 139 formed on the joint holder 94. The oval holes 137 to 139 extend in the substantially lateral direction of the body. Thus, while the bolts 111 and 115 to 117 are being loosened, when the bolt 111 is rotated, the joint holder 94 deforms in the lateral direction of the body. Therefore, as in the embodiment shown in FIG. 19, the camber angle of the wheel can be adjusted.

After the body height and the camber angle of the wheel have been adjusted, all the bolts are tightened with the nuts. Thus, the adjustment is completed. In the embodiments shown in FIGS. 20 and 21, as in the embodiment shown in FIG. 17, the functions of the bolts 112 and 113 may be reversely designated. In other words, the bolt 112 and the bolt 113 may be used for a reinforcement bolt and a cam thread member, respectively.

Figures 22A, 22B, 22C:
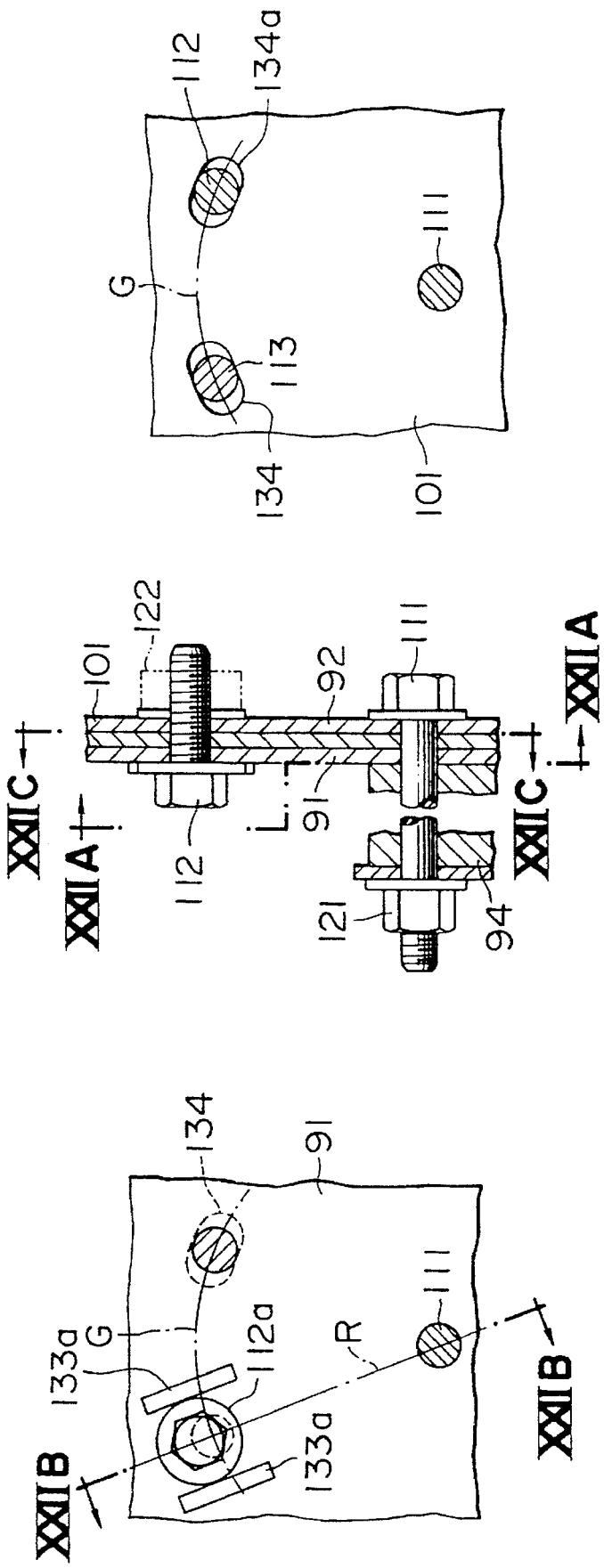
FIG. 22A is a sectional view taken along line XXIIA—XXIIA of FIG. 22B.
FIG. 22B is a sectional view taken along line XXIIB—XXIIB of FIG. 22A.
FIG. 22C is a sectional view taken along line XXIIC—XXIIC of FIG. 22B.

FIGS. 22A, 22B, and 22C show the construction of a modification of the suspension system having the body height adjustment mechanism shown in FIG. 17. In this modification, two follower cam portions 133a and 133a are opposed on a circumference G. The two follower cam portions 133a and 133a are disposed on a first arm portion 91 through a bolt 112. The bolt 112 constructs a cam thread member. A drive cam portion 112a which is engaged with the follower cam portions 133a and 133a is disposed eccentrically from the center of the bolt 112. As shown in FIG. 22C, a spring plate 101 has oval holes 134 and 134a on the circumference G. The bolts 112 and 113 pass through the oval holes 134 and 134a. Thus, when the bolt 112 is rotated, the spring plate 101 is rotated about the bolt 111 against the first arm portion 91 and the second arm portion 92. In the suspension system of this type, as in the embodiment shown in FIG. 17, the body height can be adjusted.

Figure 23C:
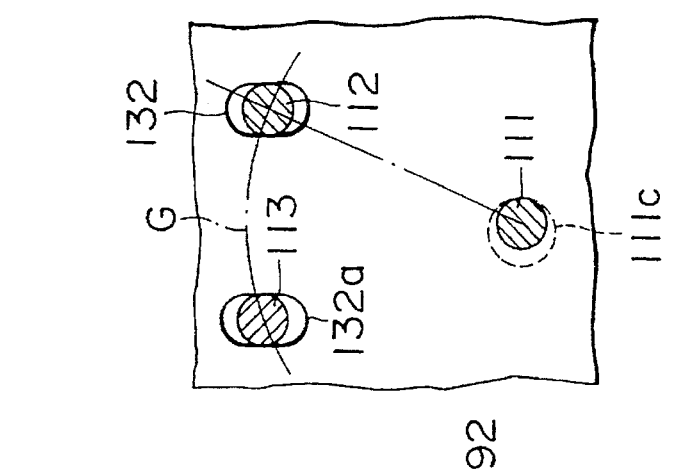
FIG. 23C is a sectional view taken along line XXIIIC—XXIIIC of FIG. 23B.
Figure 23B:
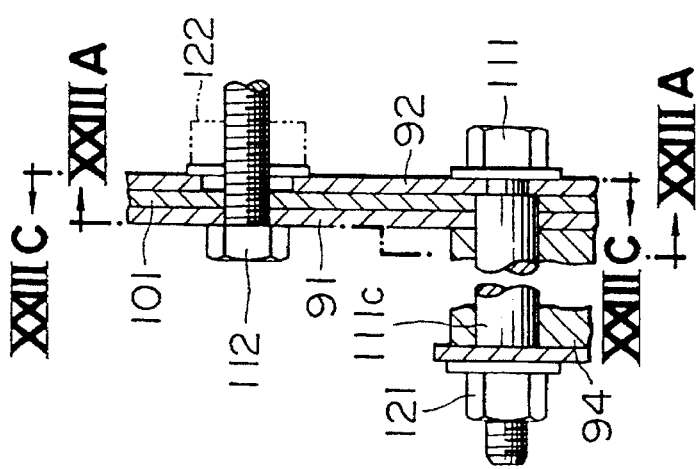
FIG. 23B is a sectional view taken along line XXIIIB—XXIIIB of FIG. 23A.
Figure 23A:
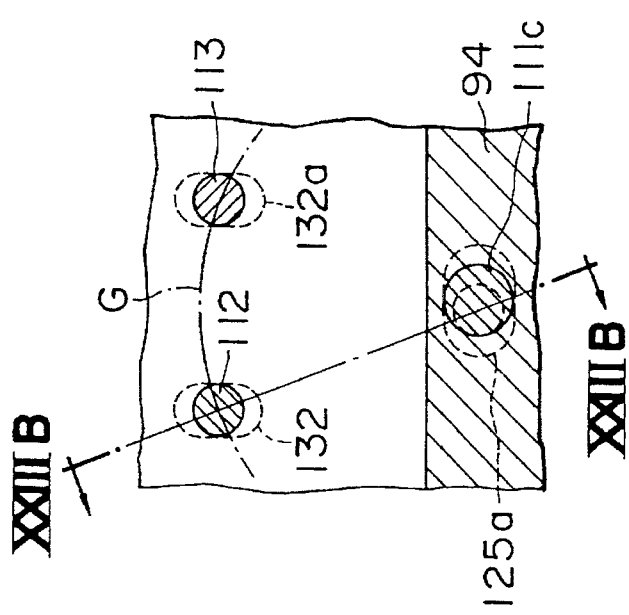
FIG. 23A is a sectional view taken along line XXIIIA—XXIIIA of FIG. 23B.

FIGS. 23A, 23B, and 23C show another modification of the suspension system having the caster angle adjustment mechanism shown in FIG. 18. In this modification, a first arm portion 91, a second arm portion 92, and a spring plate 101 each have an oval hole 135a as a follower cam portion. A drive cam portion 111c which is engaged with the follower cam portion 135a is disposed on a bolt 111. The oval hole 135a as the follower cam portion extends in a substantially vertical direction of the body as shown in FIG. 23A. Thus, when the bolt 111 is rotated, the second arm portion 92 moves in a substantially lateral direction of the body against the first arm portion 91 and the spring plate 101. As a result, a front end portion of the first arm portion 91 moves in a substantially longitudinal direction Y of the body. Therefore, the caster angle can be adjusted.

In each modification of the third embodiment, the orientations of all the bolts and nuts which are threaded thereto can be reversely designated with respect to each other. In consideration of the operability of tools for use, the orientations of the bolts and the nuts may be designated in any direction.

Next, with reference to FIGS. 24 to 27, a fourth embodiment of the present invention will be described. The fourth embodiment is substantially a modification of the first embodiment.

Figure 24:
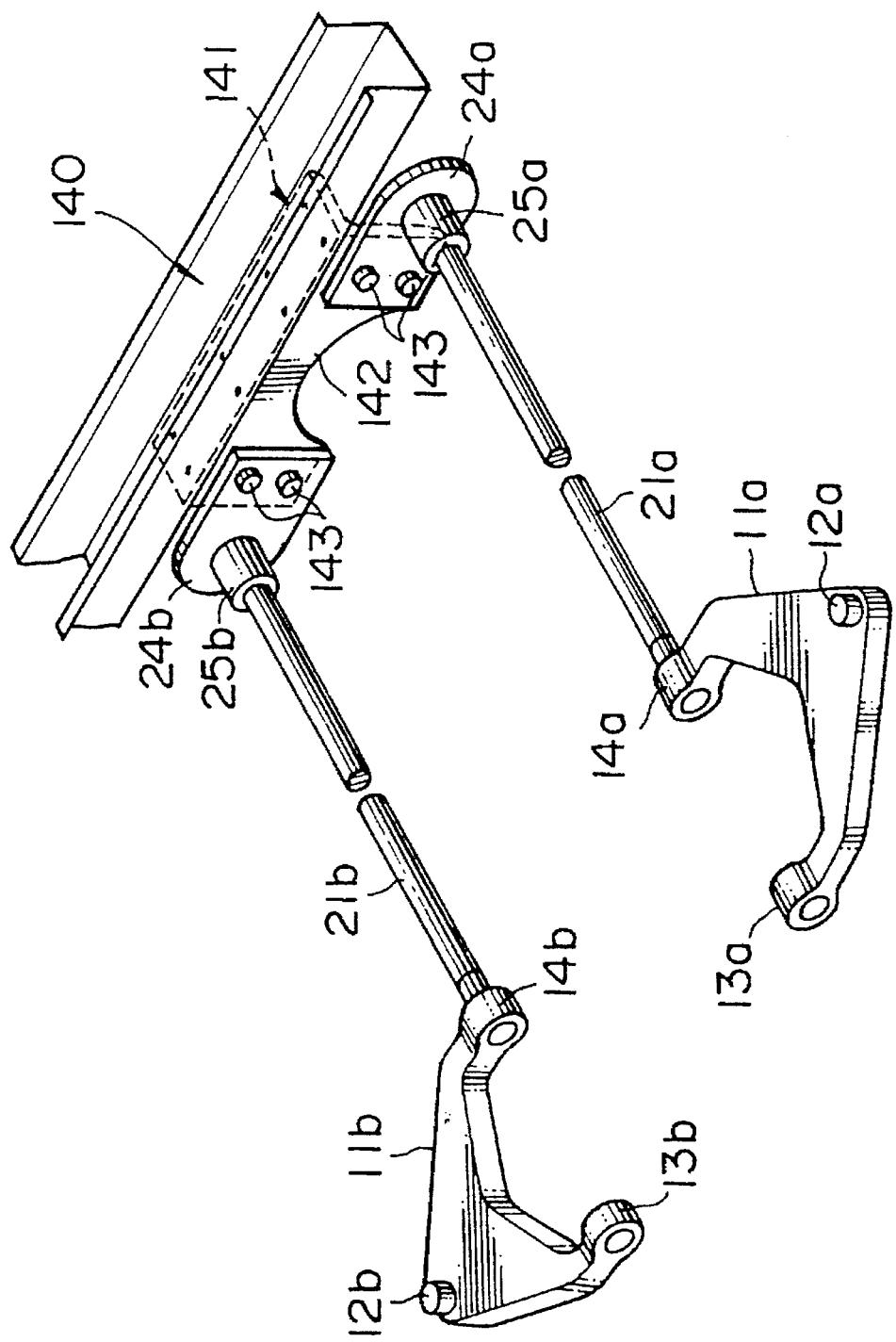
FIG. 24 is a perspective view schematically showing the structure of a suspension system for an automobile according to a fourth embodiment of the present invention.

FIG. 24 shows the fourth embodiment. This figure substantially corresponds with FIG. 1. For the sake of simplicity, the same portions as the construction shown in FIG. 1 are denoted by the same reference numerals and their description is omitted. A bracket 141 with an L-letter shaped cross section is fixed on the lower surface of a cross member 140 by welding or the like. A pair of spring plates 24a and 24b are fixed to a portion extending downwardly from the bracket 141, by bolts 143. Thus, behind proximal portions of the spring plates 24a and 24b (namely, behind sleeves 25a and 25b to which rear ends of torsion bars 21a and 21b are fixed), the cross member 140 is not present. Thus, a load is applied to lower arms 11a and 11b in a substantially longitudinal direction of the body, the suspension system can securely prevent the torsion bars 21a and 21b from directly contacting the cross member 140. Therefore, when a load is applied to the suspension system in the substantially longitudinal direction of the body and thereby the suspension system moves in this direction, the load is not transmitted to the body. As a result, the riding comfort of the automobile is securely improved.

FIGS. 25A and 25B show a first modification of the fourth embodiment. These figures substantially correspond with FIG. 3. For the sake of simplicity, the same portions as the construction shown in FIG. 3 are denoted by the same reference numerals and their description is omitted. As shown in FIGS. 25A and 25B, a pair of side members 144a and 144b are disposed on both proximal sides in the lateral direction of the floor of the body. The side members 144a and 144b are provided with brackets 145a and 145b, respectively. The inner proximal portions of the spring plates 24a and 24b in the substantially lateral direction of the body are fixed to a cross member 49 by bolts 146. The outer proximal portions of the spring plates 24a and 24b are fixed to the brackets 145a and 145b by bolts 147, respectively. In this modification, since the suspension system prevents the torsion bars 21a and 21b from directly contacting the cross member 49, it can move in the substantially longitudinal direction of the body.

Figure 26:
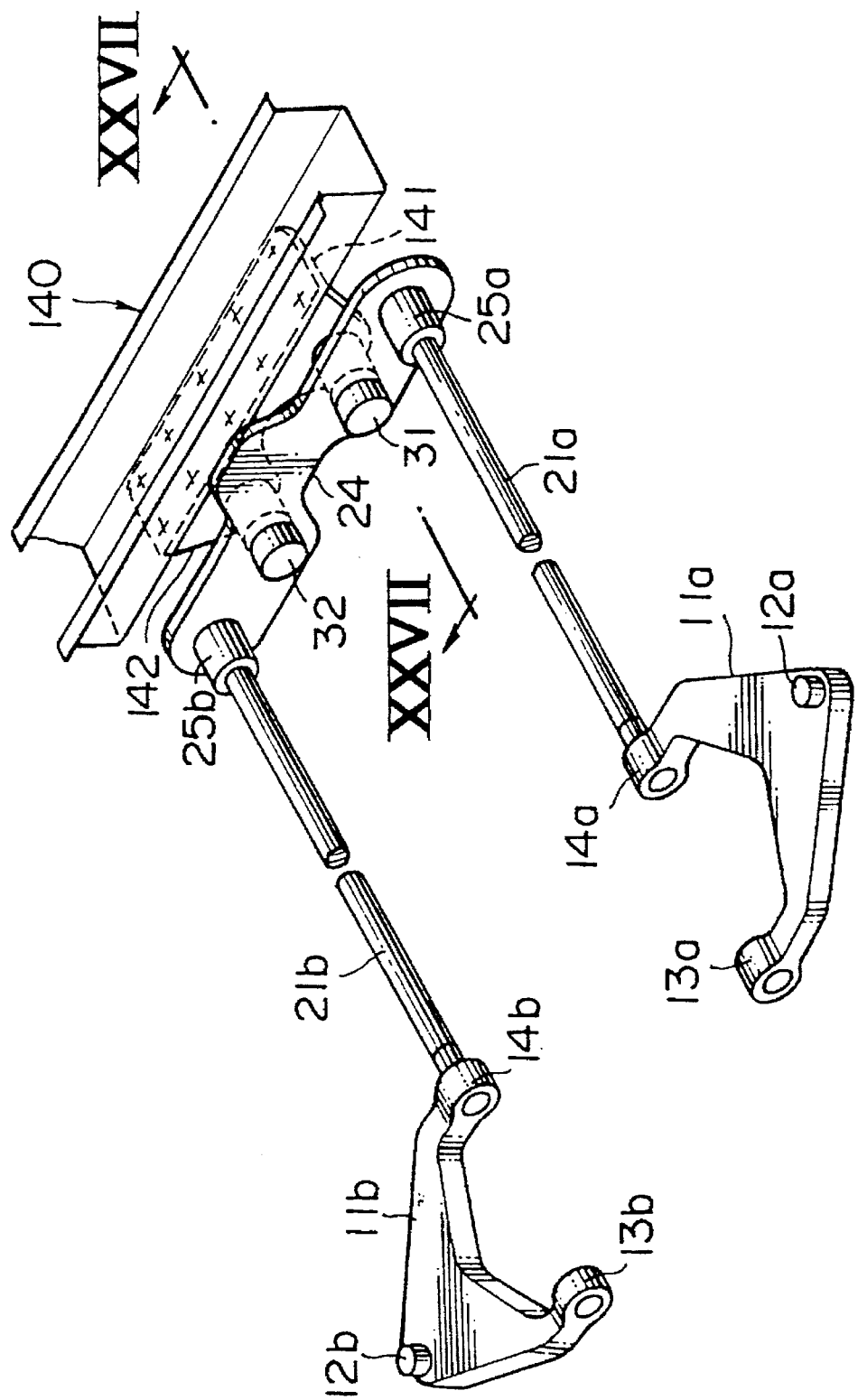
FIG. 26 is a perspective view schematically showing the structure of a suspension system for an automobile according to a second modification of the fourth embodiment.
Figure 27:
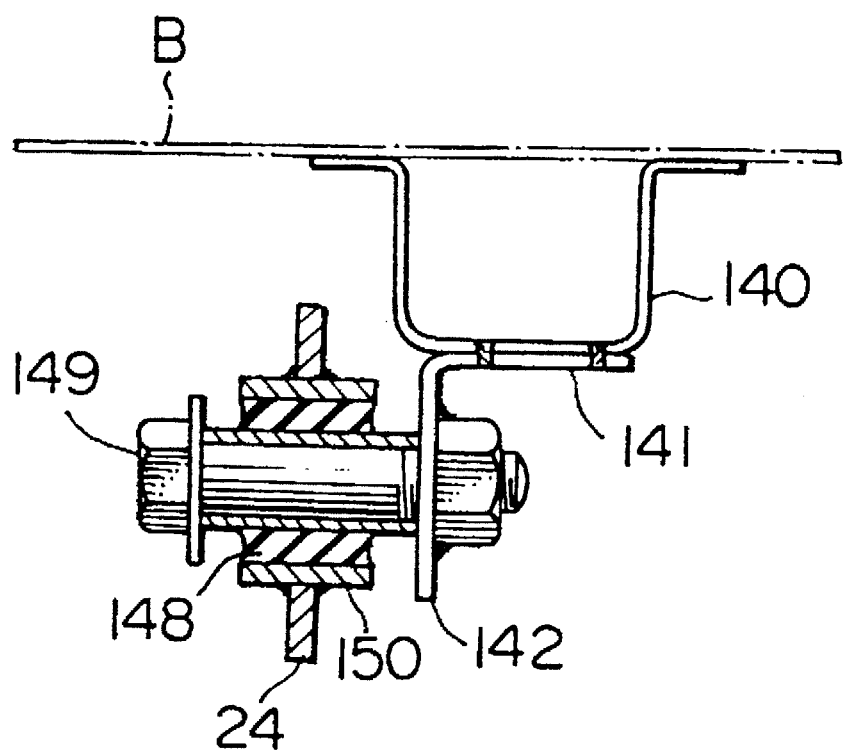
FIG. 27 is a sectional view taken along line XXVII—XXVII of FIG. 26.

FIG. 26 shows a second modification of the fourth embodiment. This figure substantially corresponds with FIG. 4. For the sake of simplicity, the same portions as the construction shown in FIG. 4 are denoted by the same reference numerals and their description is omitted. A bracket 141 with an L-letter shaped cross section is fixed to the lower surface of a cross member 140 by welding or the like. A portion 142 projects downwardly from the bracket 141. A spring plate 24 is fixed to the bracket 141 by two mounting members 31 and 32. As shown in FIG. 27, the mounting members 31 and 32 are preferably of floating type where a rubber bushing 148 is provided so as to allow the spring plate 24 to deform in the substantially longitudinal direction of the body. As shown in FIG. 27, projecting portion 142 of the bracket 141 is fixed on the lower surface of the cross member 140. A bolt 149 is mounted on the projecting portion 142. The rubber bushing 148 is mounted at an axis portion of the bolt 149. A cylindrical member 150 is disposed on an outer circumference of the rubber bushing 148. The spring plate 24 is fixed to the cylindrical member 150 by welding or the like. The floating bushing allows the torsion bars 21a and 21b to satisfactorily bend in the longitudinal direction of the body.

In addition, in the modification as shown in FIG. 5, as shown in FIG. 26, the spring plate 24 may be mounted on the bracket 141. Moreover, the floating bushing shown in FIG. 27 may be used.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A suspension system for an automobile, comprising:

a suspension arm for supporting a wheel;

means for coupling said suspension arm to a body of an automobile such that movement of said suspension arm in a substantially front to rear direction is permitted, said movement of said suspension arm producing an axial force, a torsion bar having a first end and a second end, said torsion bar extending in said substantially front to rear direction of said body and said first end of said torsion bar being connected to said suspension arm and receiving said axial force therefrom;

a spring plate extending from said body in a direction substantially perpendicular to said substantially front to rear direction and having an elastic free end portion, said second end of said torsion bar being connected with said elastic free end of said spring plate, said elastic free end of said spring plate having an unloaded position and a non-coinciding loaded position, wherein said elastic free end of said spring plate is in said unloaded position when said torsion bar receives an axial force from said suspension arm less than a deforming force and said elastic free end of said spring plate is in said loaded position when said torsion bar receives an axial force from said suspension arm greater than said deforming force, and said spring plate is positioned on said body such that said elastic free end is not obstructed by said body when in said loaded or unloaded position.

2. The suspension system according to claim 1, wherein said spring plate includes two connecting portions extending outwardly opposite to each other to be respectively connected to ends of torsion bars.

3. A suspension system according to claim 1, wherein said body includes a cross member.

4. The suspension system according to claim 3, wherein said body includes a bracket fixed on a lower surface of said member, and said spring plate includes a proximal portion mounted on the bracket.

5. The suspension system according to claim 3, wherein said spring plate includes a proximal portion mounted on said member and located inwardly from the connecting portion, and a distal portion mounted on said body and located outwardly from the connecting portion.

6. The suspension system according to claim 1, wherein said spring plate provides two connecting portions extending outwardly opposite to each other to be respectively connected to ends of torsion bars for supporting said torsion bars for right and left wheels.

7. A suspension system for an automobile, said automobile having a cross member, comprising:

a suspension arm for supporting a wheel and rotatably mounted on a body;

a torsion bar extending in a substantially front to rear direction of the body;

a first spring plate extending from said body in a substantially lateral direction and having a free end portion connected with an end of said torsion bar; and a second spring plate having a proximal portion mounted on said suspension arm and a portion connected with another end of said torsion bar, wherein said first spring plate is elastic in said substantially front to rear direction, said first spring plate is positioned so that deformation in said substantially front to rear direction is not obstructed by said said body, and when an axial load is transmitted from said torsion bar to said free end portion of said first spring plate, said free end portion is displaced, allowing said torsion bar and said suspension arm to move in said front to rear direction.

8. The suspension system according to claim 7, wherein said body includes first and second pivot portions which are shifted with each other in said substantially front to rear direction of said body, and said suspension arm includes first and second arm portions rotatably mounted on the first and second pivot portions.

9. The suspension system according to claim 8, wherein said torsion bar extends at an angle to a line connecting said first and second pivot portions and extending in a substantially front to rear direction of the body, and said second spring plate is arranged between said first and second arm portions.

10. The suspension system according to claim 8, wherein said torsion bar extends in parallel with a line connecting said first and second pivot portions and extending in said substantially front to rear direction of the body, and said second spring plate is arranged beside of one of said first and second arm portions.

11. The suspension system according to claim 6, wherein said first pivot portion is rotatable with an angle about a substantially front to rear line of the body, said second pivot portion is rotatable in the substantially front to rear direction of the body, said torsion bar extends in the substantially front to rear direction of the body, and said second spring plate is arranged beside of one of said first and second arm portions.

* * * * *